(12) United States Patent
Suzuki

(10) Patent No.: US 7,949,201 B2
(45) Date of Patent: May 24, 2011

(54) IMAGE CORRECTION PROCESSING SYSTEM AND IMAGE CORRECTION PROCESSING METHOD

(75) Inventor: Tetsuaki Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 1088 days.

(21) Appl. No.: 11/574,516

(22) PCT Filed: Sep. 1, 2005

(86) PCT No.: PCT/JP2005/015995
§ 371 (c)(1),
(2), (4) Date: Mar. 1, 2007

(87) PCT Pub. No.: WO2006/025486
PCT Pub. Date: Mar. 9, 2006

(65) Prior Publication Data
US 2007/0248282 A1 Oct. 25, 2007

(30) Foreign Application Priority Data

Sep. 1, 2004 (JP) ................................. 2004-254901

(51) Int. Cl.
*G06K 9/40* (2006.01)
*G06K 9/20* (2006.01)

(52) U.S. Cl. ....................................... 382/274; 382/282

(58) Field of Classification Search .................. 382/274, 382/282, 167–169; 358/519–523, 1.98
See application file for complete search history.

(56) References Cited

U.S. PATENT DOCUMENTS

| | | | |
|---|---|---|---|
| 5,517,333 A * | 5/1996 | Tamura et al. | 358/518 |
| 5,808,697 A | 9/1998 | Fujimura et al. | |
| 6,661,917 B1 * | 12/2003 | Nagakubo et al. | 382/169 |
| 6,927,784 B2 | 8/2005 | Matsuda et al. | |
| 7,251,056 B2 * | 7/2007 | Matsushima | 358/1.9 |
| 2007/0025635 A1 * | 2/2007 | Miyazawa | 382/274 |
| 2007/0071318 A1 * | 3/2007 | Yamashita et al. | 382/169 |

FOREIGN PATENT DOCUMENTS

| | | | |
|---|---|---|---|
| CN | 1410872 A | | 4/2003 |
| EP | 0 886 423 A1 | | 12/1998 |
| EP | 1 093 295 A2 | | 4/2001 |
| JP | 5-176220 A | | 7/1993 |
| JP | 7-296160 A | | 11/1995 |
| JP | 11-355578 A | | 12/1999 |
| JP | 2000-228747 A | | 8/2000 |
| JP | 2000-511315 A | | 8/2000 |
| JP | 2001-313844 A | | 11/2001 |

(Continued)

*Primary Examiner* — Yon Couso
(74) *Attorney, Agent, or Firm* — Dickstein Shapiro LLP

(57) ABSTRACT

An image processing system includes a local area selecting section configured to select a local area as at least one correction target from an input image, the local area including at least one pixel; a correction amount calculating section configured to calculate a gradation correction amount for the local area as the correction target; and a local gradation correcting section configured to perform a gradation correction to correct a gradation value of the local area based on the gradation correction amount to generate an image with a local gradation correction. Also, the correction amount calculating section includes a peripheral area gradation value calculating section configured to calculate a gradation value of a peripheral area of the local area; and a local area correction amount converting section configured to calculate the gradation correction amount by using the calculated gradation value of the peripheral area.

44 Claims, 20 Drawing Sheets

FOREIGN PATENT DOCUMENTS

| | | |
|---|---|---|
| JP | 2002-290707 A | 10/2002 |
| JP | 2003-209857 A | 7/2003 |
| JP | 2003-256830 A | 9/2003 |
| JP | 2003-333331 A | 11/2003 |
| WO | WO-97-45809 A1 | 12/1997 |
| WO | WO-01/26054 A2 | 4/2001 |
| WO | WO-02/27657 A2 | 4/2002 |

* cited by examiner

PRODUCTION OF PARTIAL AREAS
(IN CASE OF AREA OF 6 IN WIDTH X 6 IN HEIGHT)

CALCULATION OF REPRESENTATIVE BRIGHTNESS VALUES

WEIGHTED AVERAGE OF 4 POINTS ADJACENT TO EACH OTHER

PERIPHERAL BRIGHTNESS VALUES
BY WEIGHTED AVERAGE OF 4 POINTS ADJACENT TO EACH OTHER

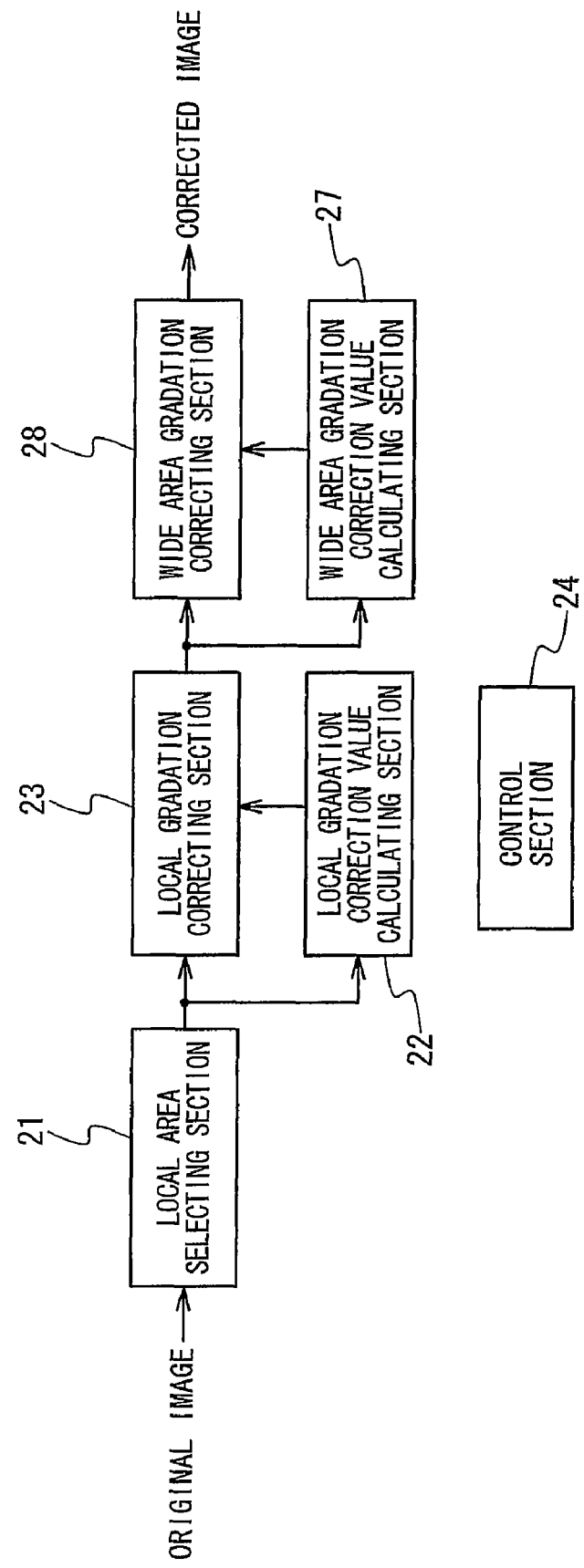

AFTER CORRECTION

LOCAL AREA GRADATION CORRECTED IMAGE

WIDE ARE GRADATION CORRECTED IMAGE ent of granu-
IMAGE CORRECTION PROCESSING SYSTEM AND IMAGE CORRECTION PROCESSING METHOD

TECHNICAL FIELD

The present invention relates to an image correction processing system and an image correction processing method, particularly to a technique to improve an intermediate gradation of an image.

BACKGROUND ART

Conventionally, a method of improving an intermediate gradation of an image has been used for improving a gradation of the image in apparatuses which deal with images such as a camera, scanner and printer. In the conventional method of improving the intermediate gradation of the image, a gradation conversion curve called a tone curve is used to convert a gradation value of an inputted original image. In case of using the gradation conversion curve, wide area processing is required in which gradation conversion processing of one-to-one correspondence relation between an input gradation value and an output gradation value is applied to entire pixels of the image. In the wide area processing, if the image has a highlight area and a shadow region, it is extremely difficult to adjust the image so as to have well balanced gradations in both of the regions. In order to solve this problem, a method of improving an image quality by using a nonlinear mask called a tone mask is disclosed in Japanese Laid Open Patent Application (JP-P2001-313844A).

A method using this tone mask will be described. According to this method, an intermediate gradation is improved in accordance with a processing flow shown in FIG. 1. That is, in this conventional method, an image as a correction target is received as an input image (S801). At this time, a tone mask image is generated form the input image (S802). A set of modified pixel values is obtained for respective pixel values of the input image (S803). A pixel value of the input image has a corresponding pixel mask value, and the modified pixel value is obtained through a nonlinear combination of a pixel value of the input image and a pixel mask value corresponding to a current pixel value.

In the method using the tone mask, the image is corrected by using the tone mask which has been produced on the basis of local data of the image. It is therefore possible to locally correct the image quality. However, this method has problems including (1) a large memory capacity to be required and (2) deterioration of the image quality in a wide area.

The problem (1) is caused by the fact that a buffer having a same size as an inputted image is also required for the tone mask. The problem (2) is caused by the fact that the utilized tone mask is produced on the basis of only local image quality.

In conjunction with the above description, an automatic exposure control apparatus is disclosed in Japanese Laid Open Patent Application (JP-A-Heisei 5-176220). In this conventional example, an average brightness in an entire screen of the image is detected, and the number of pixels, each of which has a brightness value lower than a predetermined brightness, is also calculated. A correction amount is calculated on the basis of the number of the pixels with the lower brightness values, so that a target brightness of the entire screen is calculated on the basis of the correction amount. A diaphragm is controlled to allow the average brightness to follow the target brightness.

Also, an image processing apparatus is disclosed in Japanese Laid Open Patent Application (JP-A-Heisei 11-355578). In this conventional example, a correction amount of granularity in each of a plurality of predetermined regions which are obtained by dividing an image data region is used as the basis of calculation for each of the predetermined regions. The granularity of the image data is corrected on the basis of the correction amount.

Moreover, a method of improving a digital image is disclosed in Japanese Laid Open Patent Application (JP-P2000-511315A) corresponding to PCT/US97/07996. In this conventional example, a suffix is added to express a position on a display, and digital data is provided to indicate an intensity value Ii (x, y) to each of positions (x, y) in the i-th spectral band. If it is assumed that S is the number of unique spectral bands contained in the digital data while Wn as a weighting coefficient, Fn (x, y) is a unique peripheral visual field function applied to each of positions (x, y), and N is a total number of the unique peripheral visual field functions, an intensity value to each of the positions in each of the i-th spectral bands is adjusted based on the following equation (1) so that an adjusted intensity value is generated to the position in each of the i-th spectral bands.

$$\sum_{n=i}^{N} W_n(\log I_i(x, y) - \log[I_i(x, y) * F_n(x, y)]), i = 1, \ldots, S \tag{1}$$

The intensity values adjusted to each of the positions in each of the i-th spectral bands are filtered by a common function, and a digital image is displayed which is improved on the basis of the intensity values adjusted to each of the positions in each of the i-th spectral bands by filtering.

Furthermore, an image processing method is disclosed in Japanese Laid Open Patent Application (JP-P2003-333331A). In this conventional method, a signal is corrected to decrease nonlinear distortion of input image data, so that a relative ratio to the corrected signal is calculated between a pixel value of a target pixel and pixel values of a peripheral area thereof. This relative ratio is used for determining a pixel value of a processing target pixel which corresponds to the target pixel. The relative ratio between a pixel value of the target pixel and a density value of the peripheral area thereof is further calculated while changing a target region, so that a gain coefficient is calculated in accordance with the size of the peripheral area as the target. Each of the obtained relative ratios is multiplied by a predetermined weighting coefficient and the gain coefficient to calculate a composite value. A pixel value of the processing object pixel corresponding to the target pixel is determined from this composite value.

DISCLOSURE OF INVENTION

An object of the present invention is to provide an image correction processing system, an image correction processing method, and an image correction processing program, in which processing can be performed with a small memory capacity.

Another object of the present invention is to provide an image correction processing system, an image correction processing method, and an image correction processing program, in which a correction image is caused to have an appropriate image quality in local and wide areas.

According to an aspect of the present invention, the image processing system includes a local area selecting section configured to select a local area as at least one correction target from an input image, the local area including at least one pixel; a correction amount calculating section configured to calculate a gradation correction amount for the local area; and a local gradation correcting section configured to perform gradation correction, in which a gradation value of the local area is corrected based on the gradation correction amount, to generate a local area gradation corrected image.

The correction amount calculating section may include a peripheral area gradation value calculating section configured to calculate a gradation value of a peripheral area to the local area; and a local area correction amount converting section configured to calculate the gradation correction amount by using the calculated gradation value of the peripheral area.

Moreover, the image processing system may further include a partial area brightness calculating section configured to calculate a representative gradation value in each of partial areas of the input image. The correction amount calculating section may include a partial area reference type peripheral area brightness calculating section configured to calculate a gradation value of a peripheral area to the local area by using a representative gradation value of at least one of the partial areas in vicinity of the local area; and a local area correction amount converting section configured to calculate the gradation correction amount by using the calculated gradation value of the peripheral area.

Also, the image processing system may further include a wide area correction amount calculating section configured to calculate a wide area correction amount of the local area gradation corrected image; and a wide area correcting section configured to perform wide area gradation correction on the local area gradation corrected image based on the wide area correction amount, to generate a wide area gradation corrected image.

Also, the image processing system may further include an image input unit configured to supply the input image; and an image output section configured to output the local area gradation corrected image or the wide area gradation corrected image.

Here, the gradation value may be a brightness value or a gradation value indicated by spectrum components.

The gradation correction may be repeated to the local area for a plural number of times while changing extension of the local area or maintaining the extension of the local area.

Moreover, if the local area selecting section selects a plurality of local areas, the gradation correction may be applied to each of the plurality of selected local areas.

Also, the peripheral area gradation value calculating section may calculate, as the gradation value of the peripheral area, a weighted average brightness value of the gradation value of the peripheral area and a Gaussian weights, or an average brightness value in the peripheral area. Alternatively, the peripheral area gradation value calculating section may set one or more characteristic route lines to link the local area and characteristic point, determine one or more route characteristic points in each of the characteristic route lines, and calculate a gradation value of the route characteristic point or a weighted average brightness value of the route characteristic point as the gradation value.

Also, the partial area reference type peripheral area brightness calculating section may calculate the gradation value of the peripheral area by using a product of a ratio of a distance between the local area and at least one of the partial areas in vicinity thereof, and the representative gradation of the partial area.

The representative gradation value may be an average value or a median for entire or part of pixels in the partial area.

The correction amount calculating section may calculate the gradation correction amount to apply a more intensive correction to a shadow area than a highlight area, or calculate the gradation correction amount of the local area by using brightness values of a peripheral area to the local area and brightness values in the highlight area of the image.

The local gradation correcting section may perform the gradation correction by using a nonlinear function. The wide area gradation correction may include a contrast emphasis.

According to another aspect of the present invention, the image processing method is achieved by selecting a local area as at least a correction target from an input image, the local area including at least one pixel; by calculating a gradation correction amount of the local area; and by performing gradation correction, in which a gradation value of the local area is corrected based on the gradation correction amount, to generate a local area gradation corrected image.

Here, the calculating a gradation correction amount may be achieved by calculating a gradation value of a peripheral area to the local area; and by calculating the gradation correction amount using the calculated gradation value of the peripheral area.

The image processing method may also be achieved by further including calculating a representative gradation value in each of partial areas of the input image. The calculating a gradation correction amount may be achieved by calculating the gradation value of the peripheral area by using the representative gradation value of at least one of the partial areas in vicinity of the local area; and by calculating the gradation correction amount by using the calculated gradation value of the peripheral area.

The image processing method may also be achieved by further calculating a wide area correction amount of the local area gradation corrected image; and performing wide area gradation correction on the local area gradation corrected image, to generate a wide area gradation corrected image.

The image processing method may also be achieved by further supplying the input image; and outputting the local area gradation corrected image or the wide area gradation corrected image.

Also, the gradation value may be a brightness value or a gradation value expressed by spectral components.

The image processing method may also be achieved by repeating the gradation correction to the local area for a plural numbers of times while changing extension of the local area, or maintaining the extension of the local area.

Meanwhile, if the selecting a local area comprising: selecting a plurality of local areas, the image processing method may be achieved by further performing the gradation correction to each of the plurality of selected local areas.

The calculating a gradation correction amount may be achieved by calculating, as the gradation value of the peripheral area, a weighted average brightness value of a gradation value of the peripheral area and a Gaussian weight, or an average brightness value of the peripheral area.

The calculating a gradation correction amount may be achieved by setting one or more characteristic route lines to link the local area and a characteristic point; determining one or more route characteristic points in each of the characteristic route lines; and by calculating a gradation value of the route characteristic point or a weighted average brightness value of the route characteristic point as the gradation value of the peripheral area.

The calculating a gradation value of the peripheral area may be achieved by calculating the gradation value of the peripheral area by using a product of a ratio of a distance between the local area and at least one of the partial areas in vicinity thereof, and a representative gradation value of the partial area.

The representative gradation value may be an average value or a median for entire or part of pixels contained in the partial area.

The calculating the gradation correction amount may be achieved by calculating the gradation correction amount to apply a more intensive correction in a shadow area than a highlight area.

The calculating the gradation correction amount may be achieved by calculating the gradation correction amount of the local area by using brightness of the peripheral area and brightness in a highlight area of the image.

The calculating the gradation correction amount may be achieved by performing the gradation correction by using a nonlinear function.

Moreover, the wide area gradation correction includes contrast emphasis.

BRIEF DESCRIPTION OF DRAWINGS

FIG. 11 is a block diagram showing the configuration of the image processing system according to a third embodiment of the present invention;

BEST MODE FOR CARRYING OUT THE INVENTION

Hereinafter, an image correction processing system according to the present invention will be described in detail with reference to the attached drawings.

Figure 1:
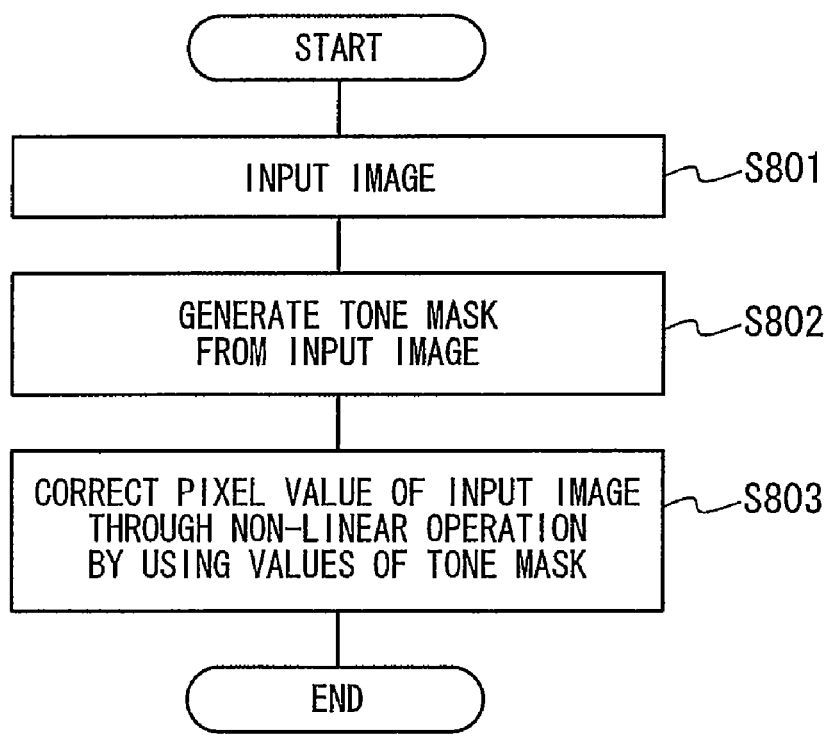
FIG. 1 is a flowchart showing an operation of a conventional method for improving an intermediate gradation.
Figure 2:
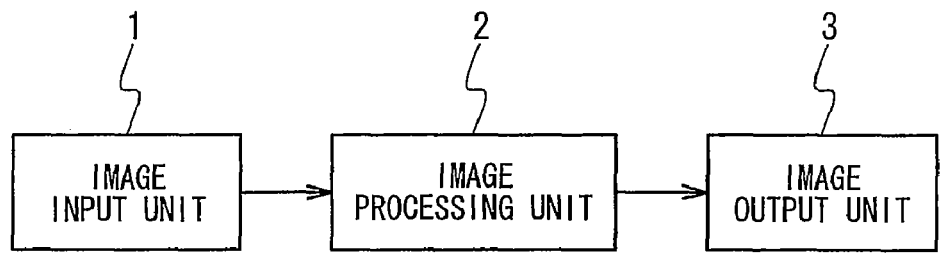
FIG. 2 is a block diagram showing the configuration of an image processing system according to a first embodiment of the present invention.

FIG. 2 is a block diagram showing the configuration of the image processing system according to the first embodiment of the present invention. The image processing system includes an image input unit 1, an image processing unit 2, and an image output unit 3. The image input unit 1 is realized by an imaging apparatus such as a camera and scanner, an image database in which image data taken by the imaging apparatus are stored, or a network connected thereto. Original image data is supplied to the image processing unit 2 from the image input unit 1. The image processing unit 2 performs correction to improve an intermediate gradation of the original image data, and outputs a corrected image data to the image output unit 3. The image output unit 3 is realized by a display, printer, and a storage medium for storing image data such as a hard disc and a memory card, or a network connected thereto, in which image data are displayed, stored and transmitted.

Figure 3:
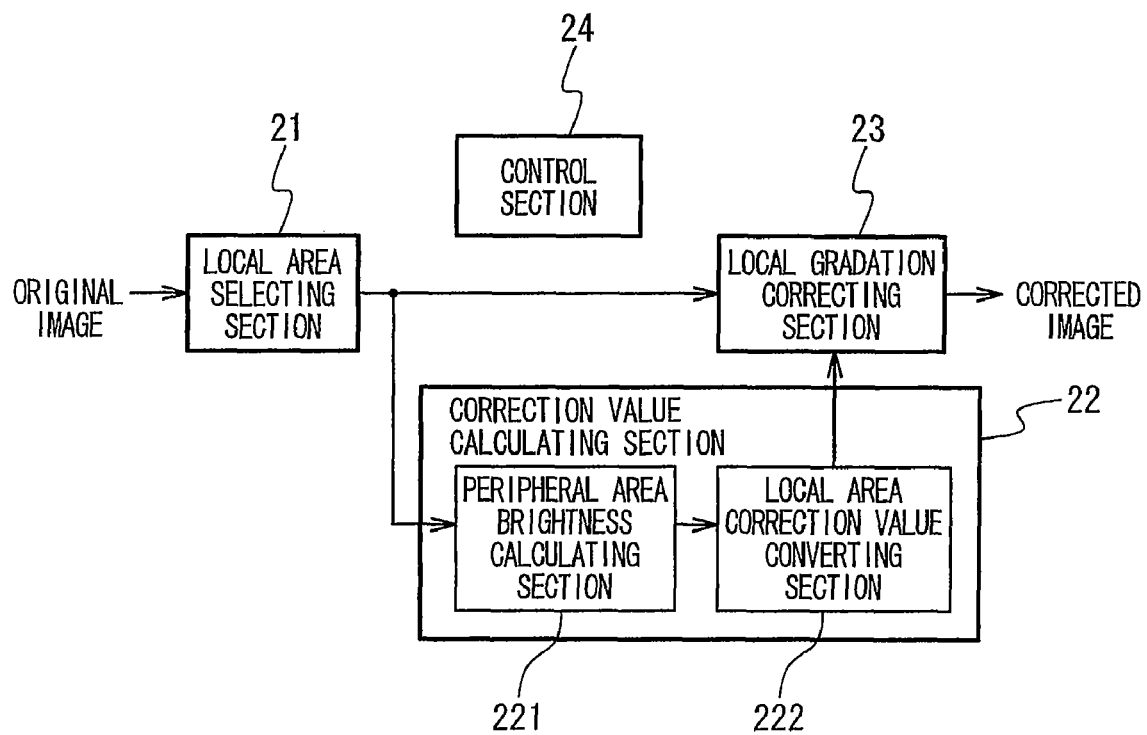
FIG. 3 is a block diagram showing the configuration of an image processing unit in the image processing system according to the first embodiment of the present invention.

The image processing unit 2 includes a local area selecting section 21, a correction amount calculating section 22, a local gradation correcting section 23, and a control section 24 as shown in FIG. 3.

The local area selecting section 21 selects at least one local area as a correction target from the original image data supplied from the image input unit 1. The local area selecting section 21 outputs the image data to the correction amount calculating section 22 and the local gradation collecting section 23.

The local area may be selected manually by a user or automatically. In case of automatically selecting, an average brightness of the image is first calculated and then an area brighter or darker by a predetermined threshold value than the average brightness may be selected as the local area. The local area is an image region composed of one or more pixels. The local area may also be a set of a plurality of pixels. When the image may be divided into a plurality of regions, each of the regions may be selected as the local area. If there are a plurality of local areas, the local areas may have a mutually overlapped region. Data to specify the selected local area is sent to the control section 24.

It is not necessary to correct all the selected local areas, and necessity of the correction can be determined based on an image statistical amount of the local area. The image statistical amount includes a dispersion of pixels and an average brightness of the local area or the like, for example. The control section 24 extracts or calculates the image statistical amount, and determines a portion which exceeds a threshold value or a portion which lower than the threshold vale as the local area to be corrected. The control section 24 stores and holds a local area specifying data to specify the local area as the correction target.

The correction amount calculating section 22 calculates a correction amount on the basis of image data of a peripheral area. The correction amount calculating section 22 is provided with a peripheral area brightness calculating section 221 and a local area correction amount converting section 222. The peripheral area brightness calculating section 221 calculates brightness values of the peripheral area of the local area as the correction target selected by the local area selecting section 21 in accordance with an instruction from the control section 24. The local area correction amount converting section 222 obtains the correction amount of the local area on the basis of the brightness values of the peripheral area calculated by the peripheral area brightness calculating section 221.

More specifically, the peripheral area brightness calculating section 221 determines the peripheral area of the selected local area from the image data on the basis of the local area specifying data supplied from the control section 24, so that the brightness values of the determined peripheral area are calculated. The local area correction amount converting section 222 obtains the correction amount of the local area on the basis of the calculated brightness values of the peripheral area.

When the local area as the correction target is set, the peripheral area is determined in the periphery of the local area. The peripheral area is assumed to be a portion within an area of a specific distance from the local area. For example, it is supposed that the center of the local area is set to be an origin, and a region of M pixels in a vertical direction and N pixels in a horizontal direction is set to be the peripheral area. In this case, M and N which indicate the size of a region should be preferably set on the basis of the size of the image. Moreover, the peripheral area may not be a rectangular region, and may be a circular or elliptical region.

The peripheral area brightness calculating section 221 may use, as the brightness values of the peripheral area, a median or an average value of a brightness histogram of the peripheral area, a weighted average brightness value which is a weighted average of brightness values of the peripheral area, and a weighted average brightness value of reference points on a characteristic route, or the like. Here, a method for calculating the weighted average brightness value AS of the peripheral region of the local area as a center, and a weighted average brightness value FS of the reference points on the characteristic route will be described.

The weighted average brightness value AS of the peripheral region of the local area as the center is calculated as follows. It is assumed that an inputted original image is I(x, y) and weighting coefficients are expressed as an isotropic 2-dimensional normal distribution H(x, y). In this case, the weighted average brightness value AS in the peripheral area with the center of a local area $(x_0, y_0)$ as a center is calculated from the following equation (2):

$$AS = H(x,y) * I(x,y) \quad (2)$$

Here, an operator * indicates a convolution operation. H(x, y) is an isotropic 2-dimensional normal distribution of a standard deviation σ with the local area $(x_0, y_0)$ as a center and satisfies the following equations (3) and (4):

$$H(x, y) = K \exp\left(-\frac{(x-x0)^2}{2\sigma^2} - \frac{(y-y0)^2}{2\sigma^2}\right) \quad (3)$$

$$\sum_{x,y} H(x, y) = 1 \quad (4)$$

Next, a method for calculating the weighted average brightness value of the reference points on the characteristic route will be described. The reference points are points which are disposed on the characteristic route and calculated as one factor of the weighted average, among characteristic points in the peripheral area. In the peripheral area, a region of pixels having brightness values higher than the periphery thereof, a region having a large edge intensity, and a region characterized by an RGB gradation value or a maximum value and a minimum value in the brightness are set as characteristic points.

Figure 5:
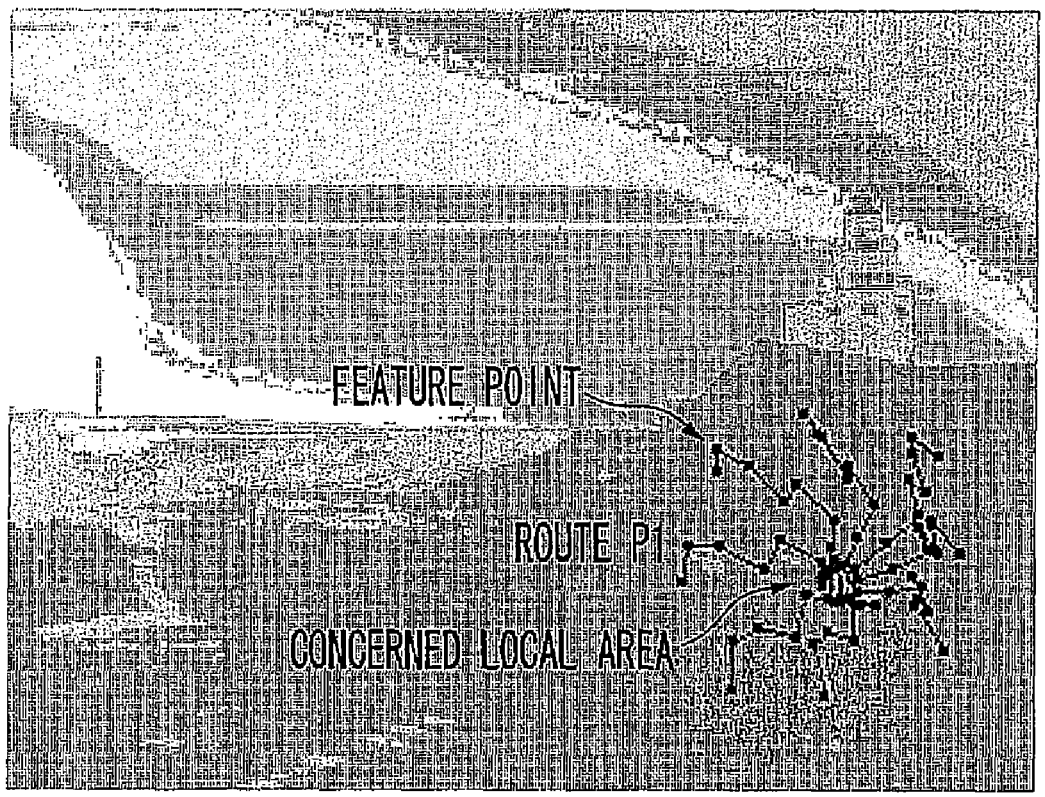
FIG. 5 is a diagram showing an example of a characteristic route in the first embodiment.

After the characteristic points are determined, the image processing unit 2 selects P characteristic points distanced from the local area as the center among the characteristic points, and sets characteristic route lines to link these P characteristic points and the local area. The characteristic route lines are set in such a manner that remaining unselected characteristic points disposed between the P characteristic points and the local area are linked as characteristic route points. The characteristic route and the characteristic points which are set as described above are as shown in FIG. 5, for example. The characteristic points on a route P1 shown in FIG. 5 are used as reference points to calculate the weighted average brightness FS. The weighted average brightness value FS of the reference points on the characteristic route is calculated from the following equation (5):

$$FS = \frac{1}{P \sum_{p=1}^{P} N_p} \sum_{p=1}^{P} \sum_{n=1}^{N_p} a(x_{pn}, y_{pn}) I(x_{pn}, y_{pn}) \quad (5)$$

Here, it is assumed that P (>0) is the number of characteristic routes, Np (>0) is the number of reference points on the characteristic route p, and a(x, y) is a coefficient. The coefficient a(x, y) uses the 2-dimensional normal distribution H(x, y) shown in the equation (3) and the equation (4), for example. The a(x, y) may also be a fixed value. The characteristic route is a route to be linked by following the characteristic points on arbitrary lines by which the characteristic points provided on the peripheral area of the local area shown in the route P1 shown in FIG. 5 are linked to the local area.

Figure 6:
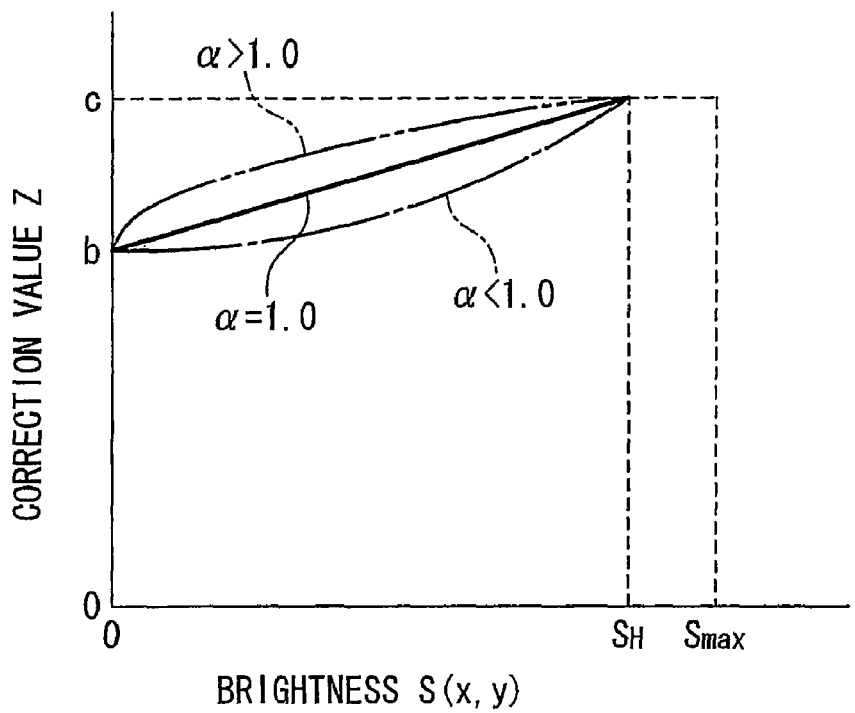
FIG. 6 is a diagram showing a conversion relationship in calculating brightness of a peripheral area according to the first embodiment.

When the brightness values in the peripheral area are calculated, the local area correction amount converting section 222 calculates a correction amount of the local area on the basis of the brightness values in the peripheral area. In the process of converting the brightness values of the peripheral area into the correction amount of the local area, the local area correction amount converting section 222 performs linear conversion and nonlinear conversion to the brightness values of the peripheral area, and outputs the correction amount to the local gradation correcting section 23. Particularly, when the local gradation correcting section 23 performs a gamma correction, the brightness values of the peripheral area can be converted into the correction amount as follows. That is, when the brightness values S of the peripheral area are obtained, the local area correction amount converting section 222 calculates a correction amount Z of the local area by use of the following equation (6) on the basis of the brightness value S of the peripheral area.

$$Z = \begin{cases} a \cdot S^\alpha + b & S < S_H \\ c & S \geq S_H \end{cases} \quad (6)$$

where $S_H$ is a brightness value in the highlight area of the image, a is a predetermined fixed value (>0), and indicates inclination of the correction amount Z, b is a predetermined fixed value ($0 \leq b \leq 1.0$), and indicates a minimum value of the correction amount Z, c is a predetermined fixed value ($0 \leq c \leq 1.0$), and indicates a fixed value of a saturated portion of the correction amount, and an index $\alpha$ is a predetermined fixed value ($\alpha \geq 0$), in which the value is determined on the basis of the image as a correction target. Accordingly, if the brightness values S of the peripheral area are less than the brightness values $S_H$ in the highlight area, the correction amount Z is determined by a function having the inclination a (>0), the intercept b ($0 \leq b \leq 1.0$), and the index $\alpha$ ($\alpha \geq 0$). If the brightness value S of the peripheral area is equal to or larger than the brightness values $S_H$ in the highlight area, the correction amount Z is set to be the fixed value c ($0 \leq c \leq 1.0$). If the following equation (7) is satisfied, the correction amount Z is set in such a manner that the brightness values S are consecutive before and after the brightness value SH, and a value range of the correction amount Z is set to be [b, c] as shown in FIG. 6. Moreover, the correction amount Z in a region having peripheral area brightness values exceeding the brightness values $S_H$ in the highlight area is set to be c. Therefore, if c is 1.0, the gradation correction is not performed in the highlight area.

$$a \cdot S_H^\alpha + b = c \quad (7)$$

The gradation correction is not performed for a region exceeding the brightness values $S_H$ in the highlight area as described above, so that the highlight area is corrected to be dark, or is not corrected to be excessively bright. Therefore, it is possible to maintain a satisfactory gradation in the highlight area.

An image quality can also be improved in the remaining regions while maintaining a gradation in the shadow region of the original image by replacing the equation (6) with the following equation (8):

$$Z = \begin{cases} a \cdot S^\alpha + b & S \geq S_L \\ c & S < S_L \end{cases} \quad (8)$$

where $S_L$ indicates a brightness values in the shadow area of the image, a is a predetermined fixed number (>0), and indicates inclination of the correction amount Z, b is a predetermined fixed number ($0 \leq b \leq 1.0$), c is a predetermined fixed number ($0 \leq c \leq 1.0$), an index $\alpha$ is a predetermined fixed number ($\alpha \geq 0$), in which a value is determined on the basis of the image as the correction target. That is, if the brightness values S of the peripheral area are equal to or larger than the brightness values $S_L$ in the shadow area, the correction amount Z is determined by a function having the inclination a (>0), the intercept b ($0 \leq b \leq 1.0$), the fixed number c ($0 \leq c \leq 1.0$), and the index $\alpha$ ($\alpha \geq 0$). For this reason, if the brightness values S of the peripheral area are less than the brightness values SL, the correction amount Z is set to be the fixed number c. If the following equation (9) is satisfied, the correction amount Z is set to be consecutive on condition that the brightness values S of the peripheral area are before and after the brightness values $S_L$ in the shadow area. At this time, the correction amount Z is set to be a value equal to or larger than c. A gamma correction amount in a region having peripheral brightness values equal to or less than the brightness values $S_L$ in the shadow area is set to be c. Therefore, if c is 1.0, the gradation correction is not made in the shadow area.

$$a \cdot S_L^\alpha + b = c \quad (9)$$

The highlight area and the shadow area will be described here. The highlight area is a set of pixels having a gradation value or a brightness value equal to or larger than a specific brightness. Meanwhile, the shadow area is a set of pixels having gradation values or brightness values equal to or less than the specific brightness. These brightness values are stored in the control section 24, and provided for the correction amount calculating section 22 if necessary. There are cases that these brightness values are determined on the basis of an experiment using various kinds of application images as the target, or obtained appropriately for each of correction target images as follows.

A histogram of gradation values or brightness values of the image is initially generated. An element with a larger gradation value or brightness value in a certain ratio is set to be a pixel in the highlight area. For example, if pixels of 1% in an image with the width of 320 pixels and the height of 240 pixels are specified to be a highlight area, the number of pixels in the highlight area is th=320×240×0.01=768 pixels. In the gradation value histogram, pixels having the gradation values which are equal to or larger than a gradation value of the 768th pixel are set to be the highlight area. Similarly, in the shadow area, pixels having a gradation value which is equal to or less than a gradation value owned by the bottom 768th pixel are set to be the shadow area. Although a ratio of the highlight area and the shadow area, a different value may be used.

The local gradation correcting section 23 corrects a gradation value of the local area selected from the image data on the basis of image data supplied from the local area selecting section 21 and a correction amount supplied from the correction amount calculating section 22. The correction image data subjected to correction is outputted to the image output unit 3. The gradation value in this example may be either a brightness value or a gradation value expressed by spectrum components.

A local gradation correction process can be realized by using a linear correction function and a nonlinear function such as a sigmoid function. If the correction amount for correcting the local area is calculated as a gamma value by the correction amount calculating section 22, the local gradation correcting section 22 converts a gradation value of the local area by use of a gamma correction equation of the following equation (10). That is, the local gradation correcting section 22 performs the gradation correction to convert a gradation value Ii (x, y) of the local area into Oi (x, y) (under the condition that i is R, G and B).

$$O_i(x, y) = \left(\frac{I_i(x, y)}{I_{max}}\right)^\gamma I_{max} (i = R, G, B) \quad (10)$$

where $I_{max}$ is a maximum value of a gradation value, and $\gamma$ is a gamma value calculated by the correction amount calculating section 22. Although the equation (10) is an equation to process R, G and B individually, only the brightness component may be corrected. In case of correcting only the brightness component, a gradation value in an RGB space is divided into a brightness component and a chrominance component. Next, only the brightness component is corrected as an input value of the equation (10). The brightness value after the conversion and the original chrominance component are again converted into a gradation value in the RGB space. Through the above-mentioned process, only the brightness component can be corrected. Furthermore, the processes of the correction amount calculating section 22 and the local gradation correcting section 23 can also be realized by using a gradation correction table which is obtained in advance in correspondence to the brightness values S of the peripheral area to be calculated by the peripheral area brightness calculating section 221. The operation time can be shortened by using the gradation correction table.

Figure 4:
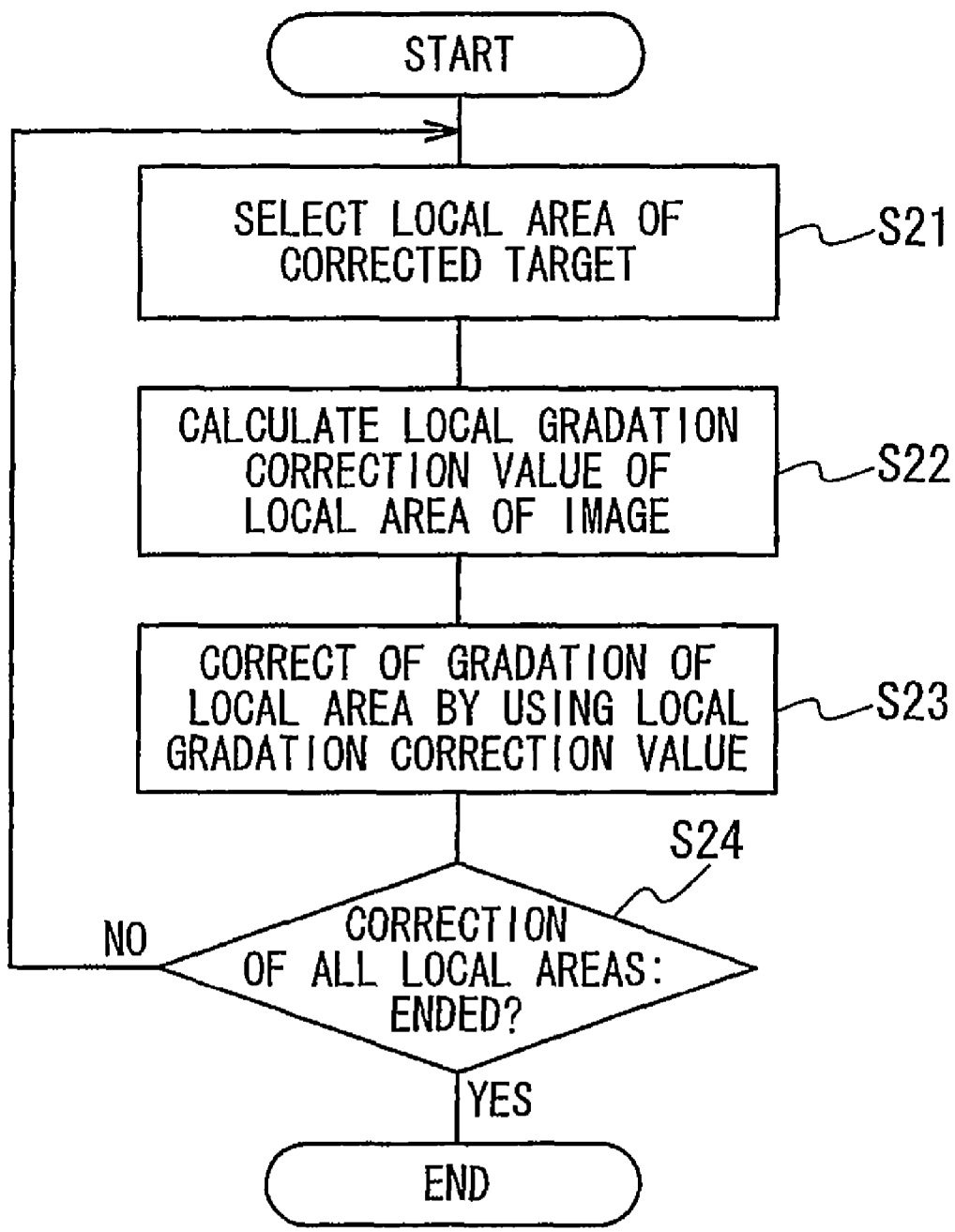
FIG. 4 is a flowchart showing an operation of the image processing system according to the first embodiment of the present invention.

Next, an entire operation of the image correction processing system in the first embodiment will be described with reference to a flowchart of FIG. 4.

An original image supplied from the image input unit 1 is initially supplied to the local area selecting section 21. The local area selecting section 21 selects a local area from the supplied original image. The control section 24 selects the local area as the correction target from the selected local areas (step S21).

Next, the correction amount calculating section 22 calculates the gradation correction amount in the selected local area of the original image (step S22). As the gradation correction amount in the selected local area, the peripheral area brightness calculating section 221 initially calculates the brightness values of the peripheral area on the basis of a median and average value of the brightness histogram in the peripheral area, a weighted average of brightness values in the peripheral area, and a weighted average brightness value of the reference points on the characteristic route or the like. The peripheral correction amount converting section 222 converts the calculated brightness values of the peripheral area into the gradation correction amount of the local area. The gradation correction amount of the local area is determined based on image quality factors such as local brightness and contrast of the original image, and is a value to determine the intensity of gradation correction for performing the gradation correction in order to optimize the image quality of the local area of the image.

When the gradation correction amount of the local area is calculated, a gradation of a concerned local area is corrected on the basis of the obtained local gradation correction amount (step S23). If the correction amount to correct the local area is calculated as s gamma value, the local gradation correcting section 22 converts the gradation value Ii (x, y) of the local area into Oi (x, y) (under condition that i is R, G and B).

This local gradation correction is performed sequentially for a local area having one or more regions. The control section 24 determines whether or not the gradation correction was performed on entire local areas as the correction target (step 24). If a local area remains without the correction (step S24—NO), the acquisition of the correction amount and the gradation correction are performed for the local area. If the process is completed for entire local areas (step S24—YES), the gradation correction is ended to output a corrected image to the image output unit 3. The corrected image may be outputted to the image output unit 3 every time the correction for each of the local areas is ended.

Although it has been described here that the local gradation correction is performed once for each of local areas, the local gradation correction may be repeated for plural numbers of times because each of local gradations is corrected through the local gradation correction. In this case, the gradation correction may be performed while maintaining the extent of the local area, and if the gradation correction is performed by changing the extension of the local area, it is possible to prevent the progress of excessive correction influenced by the local area such as a significant point. In this case, the correction may be performed while the control section 24 supplies a threshold value to the local area selecting section 21 to select a new local area as the correction target. The gradation correction may also be performed by dividing an entire image into a plurality of regions to be used as the local areas.

The gradation correction in the local area is performed as described above. An example in which the above gradation correction is applied will be described here. A system in the example includes a CCD camera as the image input unit 1, a personal computer as the image processing unit 2, and a display as the image output unit 3.

The personal computer includes a CPU (central processing unit) 31, an input unit 32, an output unit 33, a memory unit 34, and an external storage unit 35. The CPU 31 reads out a program stored in the memory unit 34 to execute it, and performs an image gradation correction process on the basis of image data and operation data stored in the memory unit 34 or the external storage unit 35. The input unit 32 latches image data from the CCD camera, and the output unit 33 outputs the latched image data which is subjected to the correction process, to the display. The memory unit 34 stores the supplied image data, keeps the operation progress, and holds a program for the process operation. The external storage unit 35 stores the program which is held in the memory unit 34, and keeps contents of the memory unit 34.

The personal computer is provided with the local area selecting section 21, the correction amount calculating section 22, and the local gradation correcting section 23 which are realized by software as the image processing unit 2. With respect to a portion having a large repetitive operation amount, an exclusive-use hardware may be mounted. Moreover, in case of the gamma correction, the correction amount calculating section 22 calculates the gamma value, so that the local gradation correcting unit uses the calculated gamma value for performing the gamma correction. A case of the gamma correction will be described, and if a correction is performed by a sigmoid function, inclination of the sigmoid function and a parameter such as a shift amount are calculated.

Figure 15A:
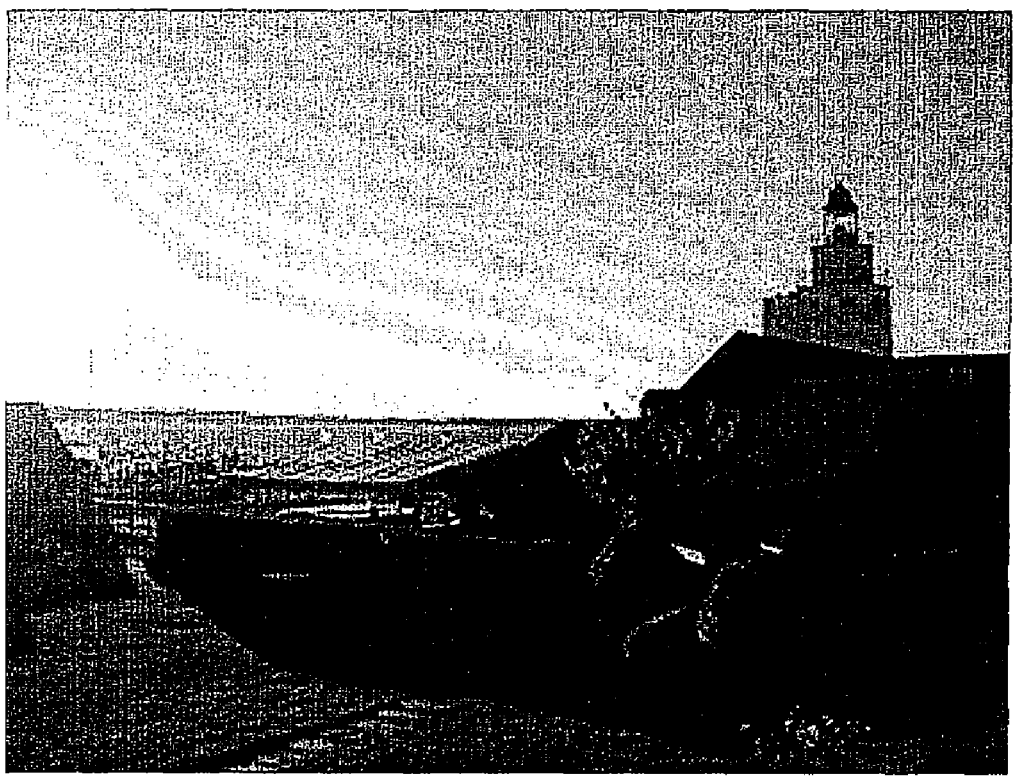
FIG. 15A is a diagram showing an example of image processing according to the first embodiment.
Figure 15B:
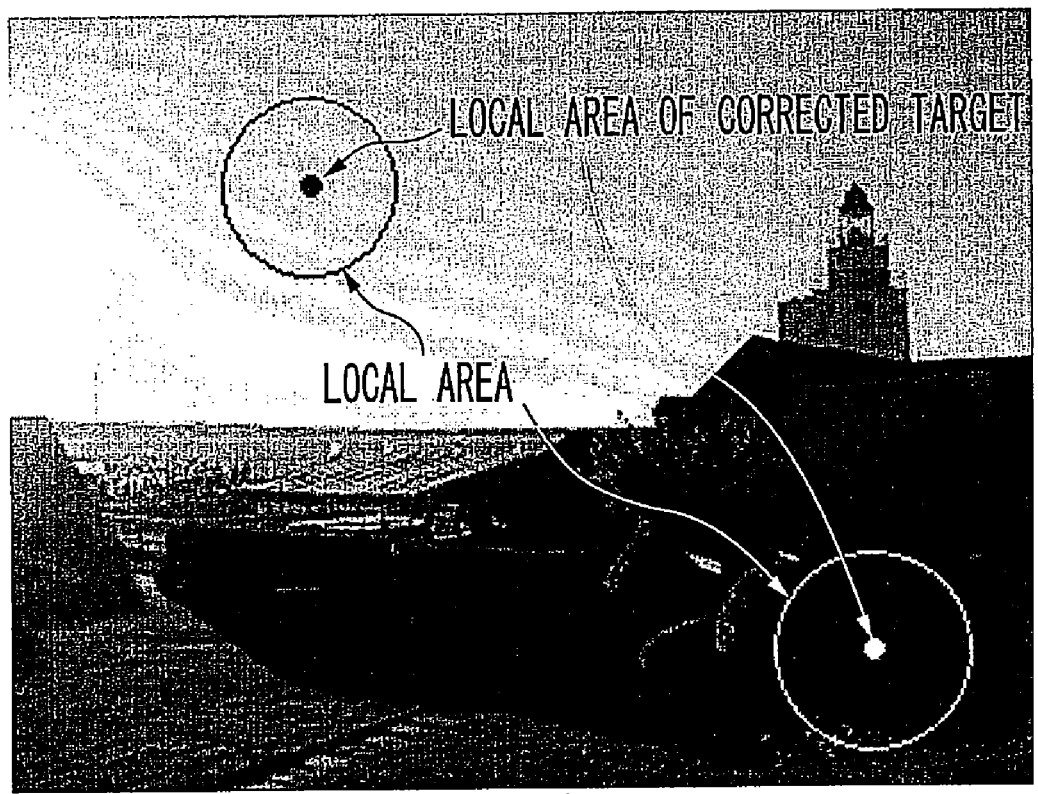
FIG. 15B is a diagram showing an example of the image processing according to the first embodiment.
Figure 15C:
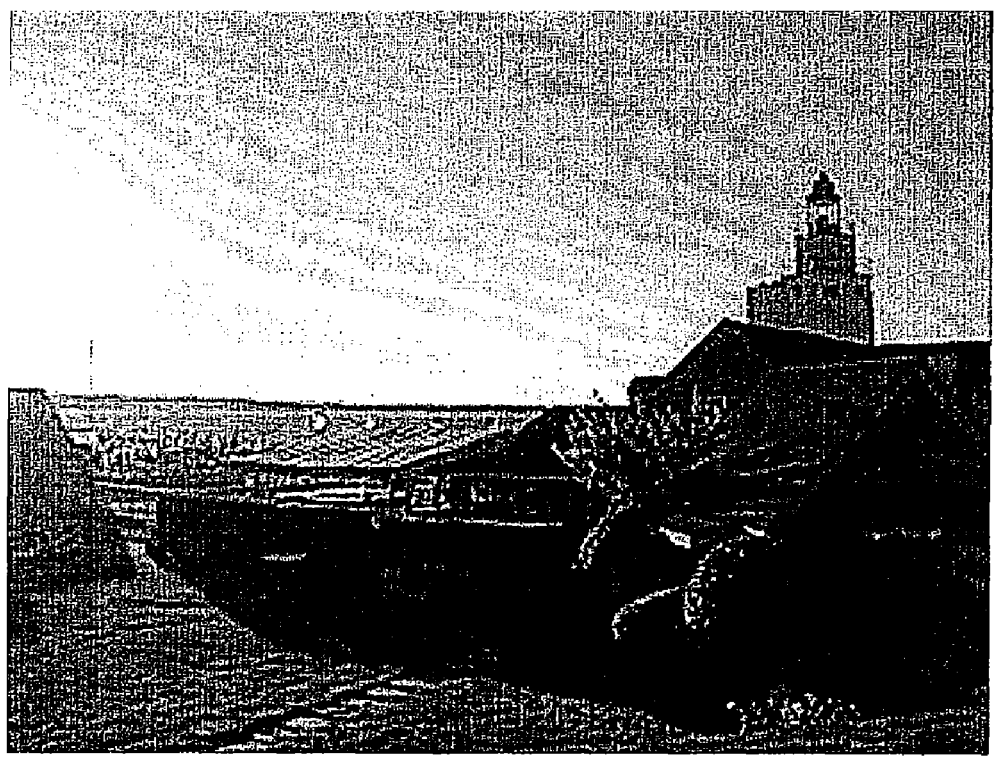
FIG. 15C is a diagram showing an example of the image processing according to the first embodiment.

It is assumed that an original image shown in FIG. 15A is supplied from the CCD camera. The CPU 31 selects the local area which is one pixel in the original image, and calculates the brightness values of the peripheral area to the local area as shown in FIG. 15B. Two parts are indicated as the local area in FIG. 15B, in which the peripheral area is indicated by a circle with a radius R using the local area as the center. The brightness values of the peripheral area are initially calculated. When the brightness values of the peripheral area are calculated, the correction amount is calculated in accordance with the equation (6) on the basis of the brightness values of the peripheral area, so that the gamma value to correct the local area is obtained. In case of a low brightness value of the peripheral area as shown in bottom right of FIG. 15B, the gamma value for correcting the local area is close to the b value (ex. 0.5) of the equation (6). As a result, the gradation value of the local area is corrected to be bright by the gamma correction. Meanwhile, in case of a high brightness value of the peripheral area as shown in top left of FIG. 15B, and particularly when the brightness value exceeds the $S_H$ value of the equation (6), the gamma value is made to be 1.0 (=c). Accordingly, a gradation value of the local area is not influenced by the gamma correction, and the original image remains without any changes. The process as described above is performed for the entire local areas, so that a dark part of the image is corrected to be bright and a bright part thereof is stored as the original image without any changes. As a result, the visibility of the dark part in the image is improved as shown in FIG. 15C. Lastly, the result of the process is outputted to the display, and the processing is ended.

Figure 7:
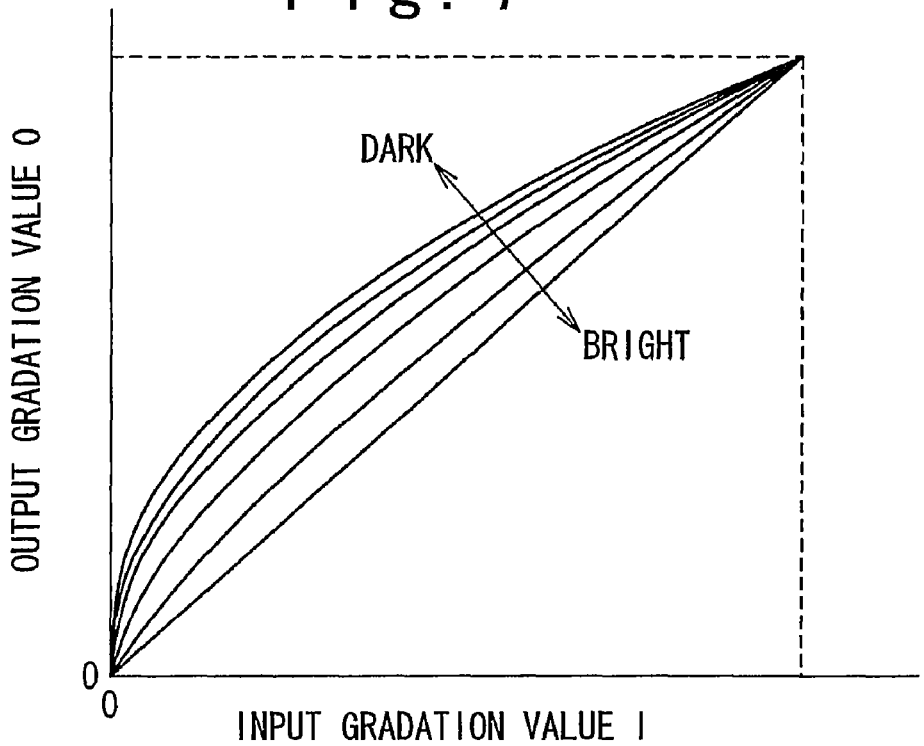
FIG. 7 is a diagram showing an example of a local gradation correction according to the first embodiment.

As described above, the personal computer executes a program to process image correction, so that the correction amount is determined in accordance with the image quality of the peripheral area, and the image quality of the local area is corrected. In case of applying the above-mentioned gamma correction and the equation (6), the gradation correction function of the local area is changed in accordance with brightness values of the local area of the image as shown in FIG. 7. Accordingly, the process such as brightening a dark region and maintaining a gradation of the original image in the bright region without making any changes is realized. As a result, the image quality in the dark part can be improved while maintaining the image quality in the bright part of the image. On the contrary, the image quality in the bright part can also be improved while maintaining the image quality in the dark part by applying the above stated gamma correction and the equation (8).

This embodiment is configured to obtain the gradation correction amount of the local area from the image and to sequentially perform the gradation correction for each of local areas. For this purpose, between the correction amount and various kinds of data required for obtaining the correction amount, a data amount stored in the memory unit 34 and the external storage unit 35 can be made smaller than the data size of an inputted original image.

Moreover, because the gradation correction can be performed in accordance with the image quality of the local area, the image quality of the local area can be appropriately corrected.

Furthermore, in case of using a weighted average brightness value of a characteristic route, the number of points to be referred to in the operation is small in comparison with other methods to calculate the peripheral area, so that a high-speed operation can be achieved. Accordingly, calculation costs can be reduced.

Figure 8:
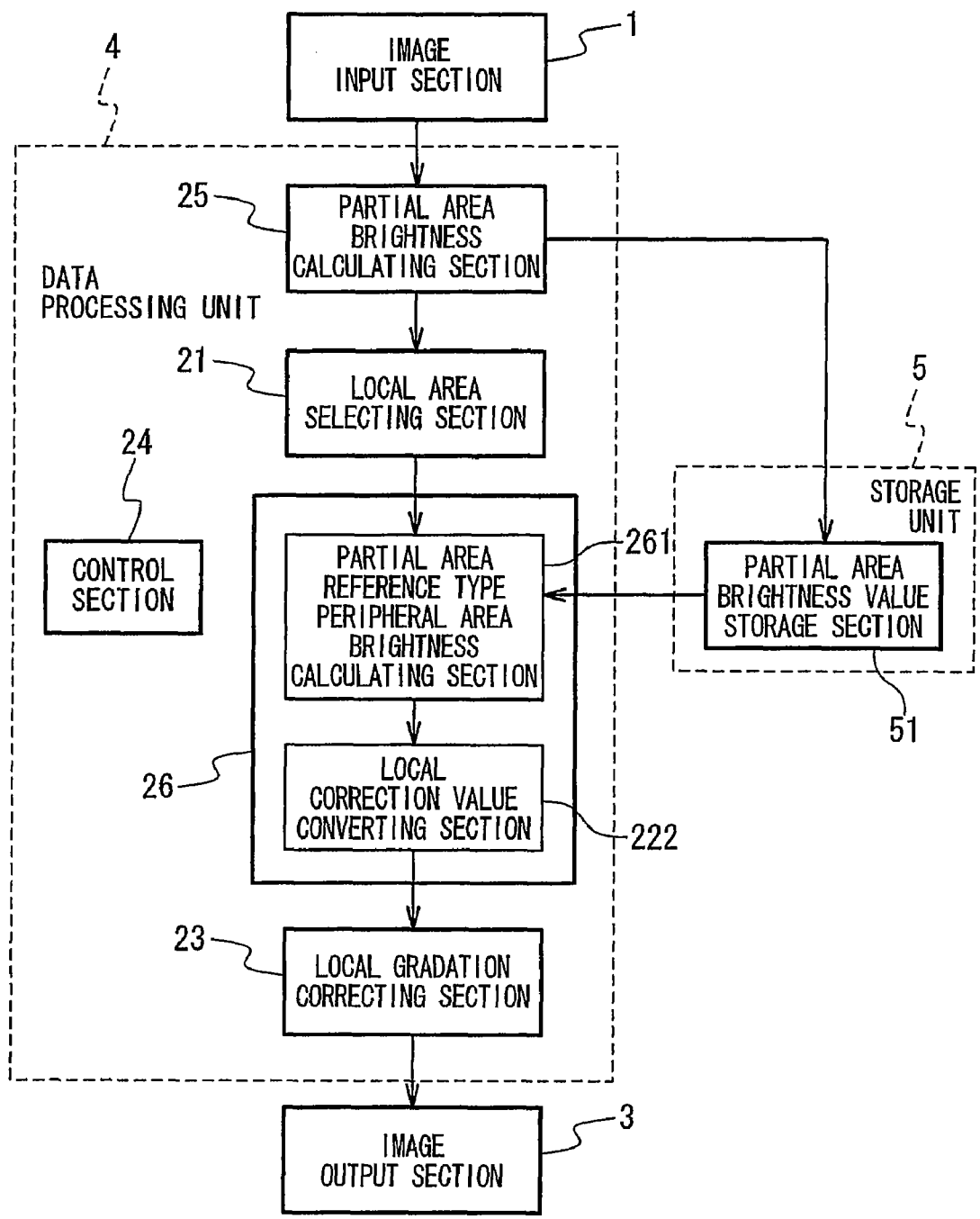
FIG. 8 is a block diagram showing the configuration of the image processing system according to a second embodiment of the present invention.

Next, the details of the image processing system according to the second embodiment of the present invention will be described. FIG. 8 is a block diagram showing the configuration of the image processing system in the second embodiment. Referring to FIG. 8, the image processing system in the second embodiment has the configuration different from that of the first embodiment in a point that a storage unit including a partial area brightness value storing section 51, and a partial area brightness calculating section 25 are added. Also, the correction amount calculating section 22 in the first embodiment is replaced with a correction amount calculating section 26 in the second embodiment. The correction amount calculating section 26 is provided with a partial area reference type peripheral area brightness calculating section 261 in place of the peripheral area brightness calculating section 221. These different points will be described below accordingly.

The partial area brightness calculating section 25 divides an area of an input image into m areas in a horizontal direction and n areas in a vertical direction, and a representative brightness value is calculated in each of the areas to store the representative brightness value in the partial area brightness value storing unit 51.

The correction amount calculating section 26 calculates the local area correction amount by using the representative brightness value stored in the partial area brightness value storing unit 51. More specifically, the partial area reference type peripheral area brightness calculating section 261 calculates the peripheral area brightness values by using a representative brightness value of the partial area which is positioned in the vicinity of the local area, so that the local area correction amount converting section 222 determines the local area correction amount by using the calculated peripheral area brightness values.

Figure 9:
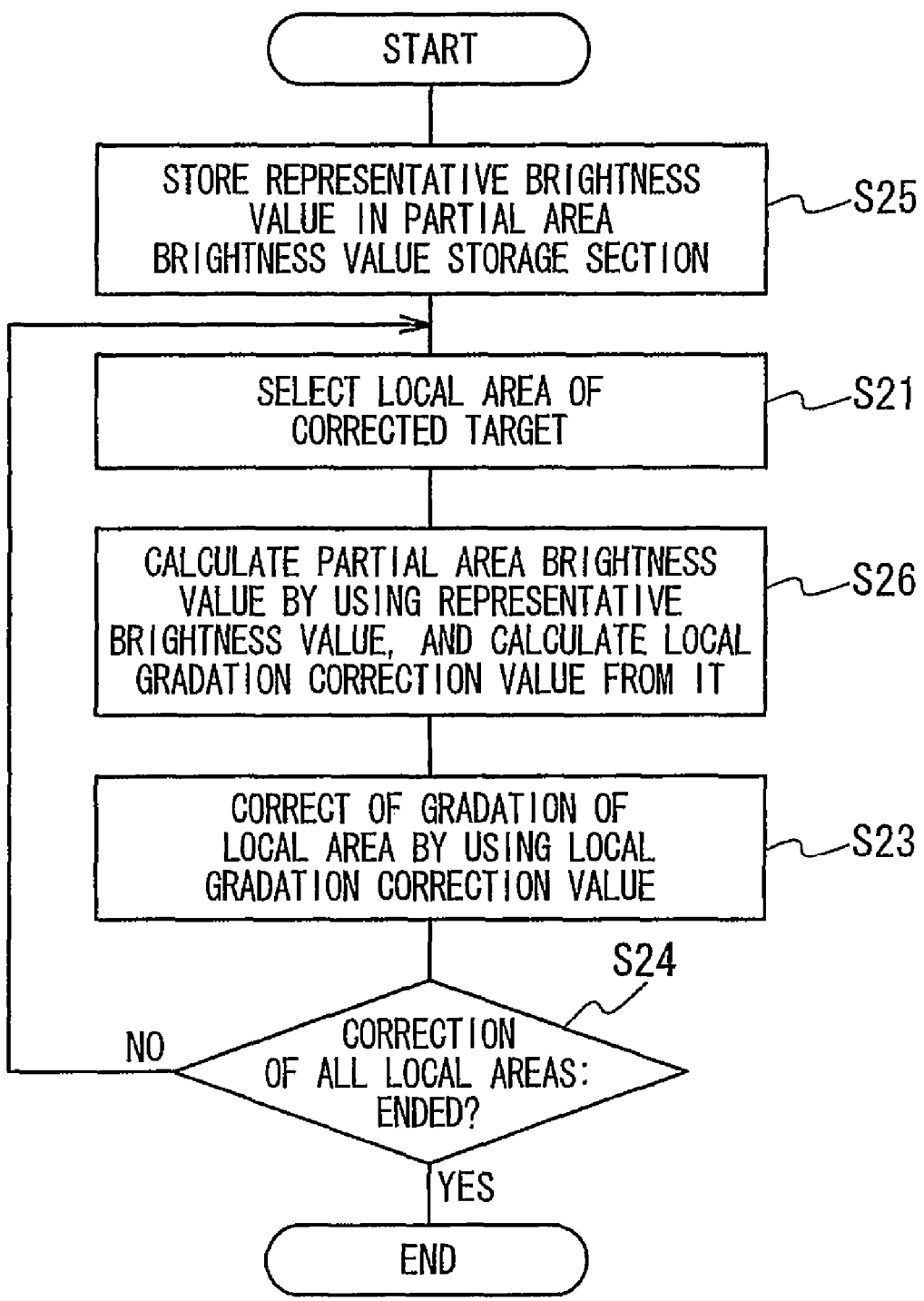
FIG. 9 is a flowchart showing an operation of the image processing system according to the second embodiment.

The details of an operation of the image processing system in the second embodiment will be described with reference to a flowchart shown in FIG. 9. The processes shown in steps S21, S23 and S24 of FIG. 9 are the same as those of the steps S21, S23 and S24 in the first embodiment shown in FIG. 4, thereby description thereof will be omitted.

Figure 10A:
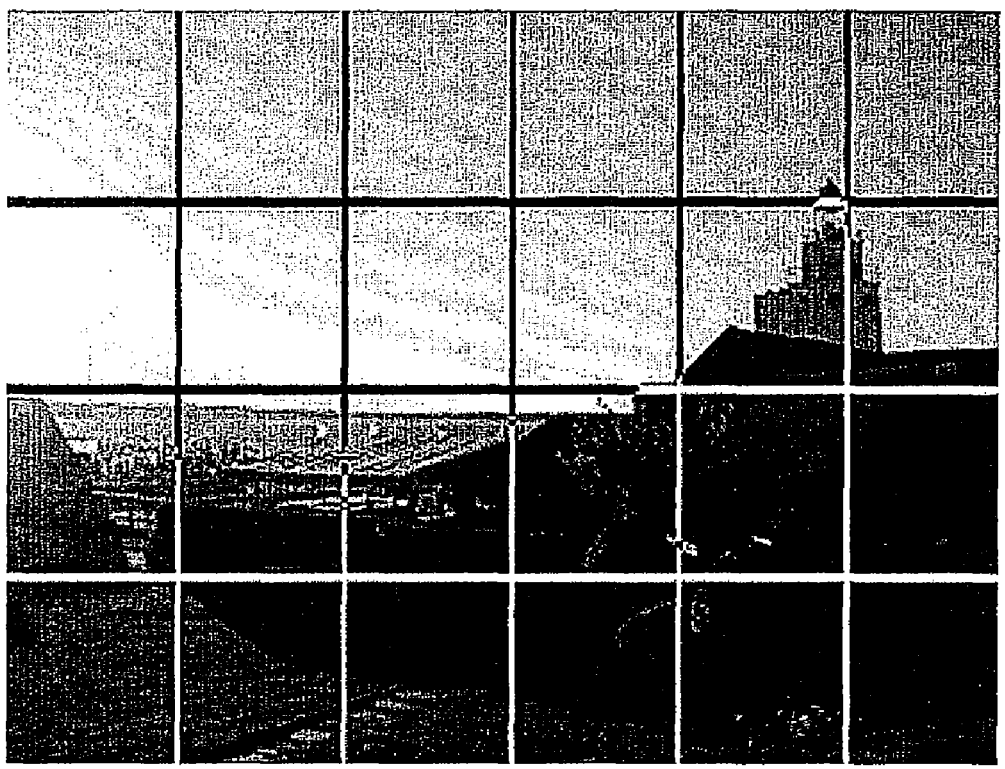
FIG. 10A is a diagram showing a method for calculating a 4-point weighted average brightness value exemplified as a partial area reference type peripheral area brightness calculation method according to the second embodiment.
Figure 10B:
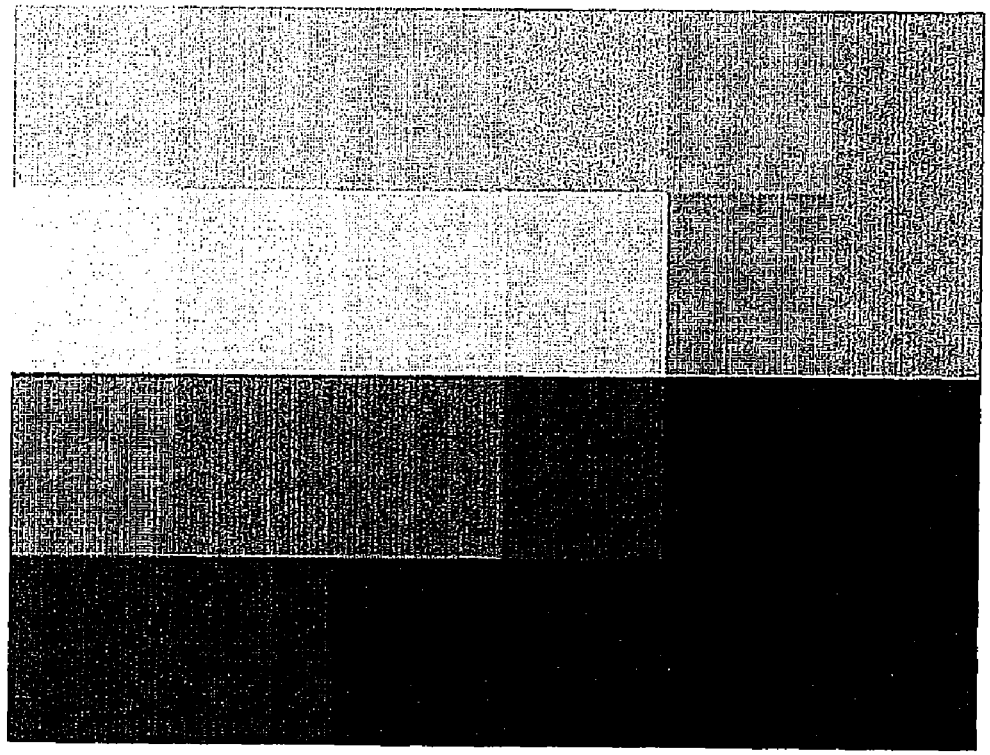
FIG. 10B is a diagram showing the method for calculating the 4-point weighted average brightness value exemplified as the partial area reference type peripheral area brightness calculation method according to the second embodiment.

In the second embodiment, when the image is inputted, the partial area brightness calculating section 25 divides an area of the input image into m areas in the horizontal direction and n areas in the vertical direction (m, n>0) as shown in FIG. 10A, and a representative brightness value is obtained in each of the areas as shown in FIG. 10B, so that the representative brightness value is stored in the partial area brightness value storing section 51 (step S25). The local area selecting section 21 selects the local area as the correction target in the same manner as in the first embodiment (step S21). The partial area reference type peripheral area brightness calculating section 261 in the correction amount calculating section 26 calculates the peripheral area brightness values of the local area by using the representative brightness value calculated at the step S25, and the local area correction amount converting section 222 calculates the correction amount in the selected local area (step S26).

Figure 10C:
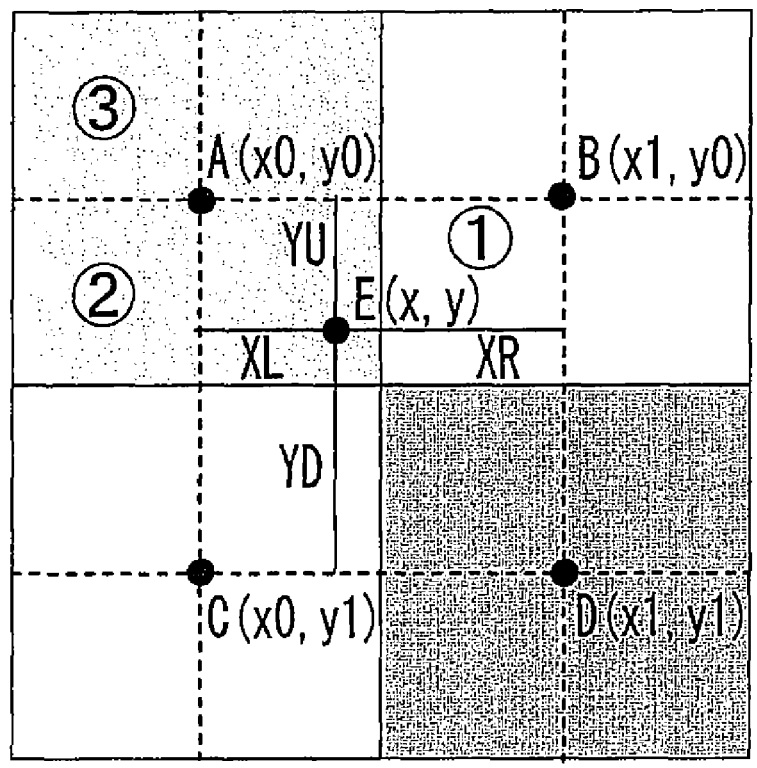
FIG. 10C is a diagram showing the method for calculating the 4-point weighted average brightness value exemplified as the partial area reference type peripheral area brightness calculation method according to the second embodiment.

As the representative brightness value of the partial area, the average value and median of the partial area can be employed. The partial area reference type peripheral area brightness calculating section 261 also calculates a 4-adjacent weighted average value IS as the brightness values of the peripheral area by using the representative brightness value of the partial area, for example. The 4-adjacent weighted average value IS is obtained through linear interpolation using the representative brightness value $S_L$ in the nearest adjacent region of the target region. It is assumed that a point E in FIG. 10C is a target pixel, and x coordinate of the point E is on a position which internally divides a line segment AB into XL and XR, while y coordinate thereof is on a position which internally divides a line segment AC into YU and UD. In this case, an average brightness value of the target pixel is determined, depending on the position of the target pixel E among areas 1, 2 and 3 which are surrounded by dot lines for linking center points of partial areas in FIG. 10C, using following equations (11), (12) and (13).

Region 1: to be calculated from four adjacent regions $$S(x,y)=XR \cdot YD \cdot S_L(x0,y0)+XL \cdot YD \cdot S_L(x1,y0)+ \\ XR \cdot YU \cdot S_L(x0,y1)+XL \cdot YU \cdot S_L(x1,Y1) \quad (11)$$

Region 2: to be calculated from two adjacent regions $$S(x,y)=YD \cdot S_L(x0,y0)+YU \cdot S_L(x0,y1) \quad (12)$$

Region 3: to be calculated from a single region $$S(x,y)=S_L(x0,y0) \quad (13)$$

It should be noted that XL+XR=1 and YU+UD=1.

Figure 10D:
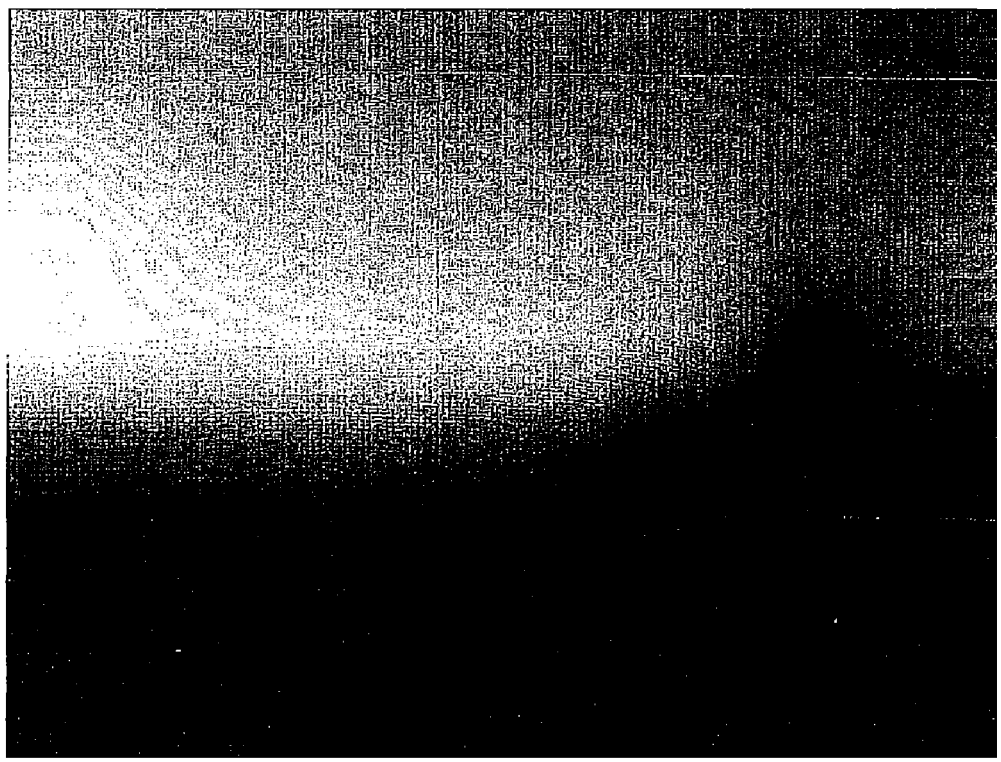
FIG. 10D is a diagram showing the method for calculating the 4-point weighted average brightness value exemplified as the partial area reference type peripheral area brightness calculation method according to the second embodiment.

If the peripheral area brightness values are calculated on the basis of the above equations, it is possible to obtain the peripheral area brightness values which are close to the peripheral area brightness values obtained from the weighted average brightness value AS as shown in FIG. 10D.

Although a memory capacity of approximately several bites is required to store the representative brightness value of the partial area in case of using the 4-adjacent weighted average amount in the second embodiment, an operation reference to calculate a characteristic route such as the case of the weighted average brightness value of the characteristic route is not necessary, and the number of points for the operation reference is small in comparison with other methods to calculate the brightness values of the peripheral area, resulting in permitting a high speed operation.

Next, an image processing system according to the third embodiment of the present invention will be described. In the third embodiment, the gradation correction is performed at two steps including the local gradation correction and the wide area gradation correction. The image processing system is configured to have a portion similar to the first embodiment as shown in FIG. 2, and the image processing unit 2 is configured as shown in FIG. 11.

The image processing apparatus according to the third embodiment includes the local area selecting section 21, the correction amount calculating section 22, the local gradation correcting section 23, the wide area gradation correction amount calculating section 27, and the wide area gradation correcting section 28 as shown in FIG. 11. The local area selecting section 21, the correction amount calculating section 22, and the local gradation correcting section 23 are similar to those of the first embodiment. The wide area gradation correction amount calculating section 27 and the wide area gradation correcting section 28 processes the wide area gradation correction. Since the local gradation correction process is similar to the process in the first embodiment, description thereof will be omitted here.

In the wide area gradation correction process, an image subjected to the local gradation correction is outputted from the local gradation correcting section 23 to the wide area gradation correction amount calculating section 27 and the wide area gradation correcting section 28. The wide area gradation correction amount calculating section 27 calculates the wide area gradation correction amount to improve the image quality in the wide area from the image after local area correction by the local gradation correcting section 23. The wide area gradation correcting section 28 corrects the gradation of the entire image on the basis of the wide area gradation correction amount which is calculated by the wide area gradation correction amount calculating section 27. Image data subjected to the local gradation correction and the wide area gradation correction is outputted from the wide area gradation correcting section 28 to the image output unit 3.

The wide area gradation correction amount calculating section 27 determines the correction amount for correction to obtain an optimum image quality in the wide area with respect to an image in which an image quality thereof was locally optimized by the local gradation correcting section 23. For the wide area correction, gradation correction methods such as a contrast correction and the gamma correction to adjust the image quality of the entire image can be employed. The wide area gradation correction amount calculating section 27 calculates the correction amount by these wide area image quality correction methods. For example, in case of using the contrast correction, the correction amounts a and b as coefficients of a conversion equation of the contrast correction are calculated by the following equations $$a = \frac{HL_{opt} - SH_{opt}}{HL - SH} \quad (14)$$

$$b = \frac{HL \cdot SH_{opt} - SH \cdot HL_{opt}}{HL - SH} \quad (15)$$

where $HL_{opt}$ and $SH_{opt}$ indicate optimum gradation values of the highlight area and the shadow area of the image, respectively. Also, HL and SH are brightness values of the highlight area and the shadow area of the original image. The brightness value HL in the highlight area is a maximum gradation value in the image when low-pass filtering LPF (x, y) is applied to a brightness image I (x, y) generated from an inputted original image as shown in the following equation (16). The brightness value SH in the shadow area is a minimum gradation value in the image when the low-pass filtering LPF (x, y) is applied to the brightness image I (x, y) generated from an inputted original image as shown in the following equation 17.

$$HL = \max(I(x,y)*LPF(x,y)) \quad (16)$$

$$SH = \max(I(x,y)*LPF(x,y)) \quad (17)$$

It should be noted that an operator * indicates a convolution operation. Also, a function max( ) and a function min( ) are functions in which a maximum value and a minimum value of elements in brackets are used as a function value, respectively.

After the wide area gradation correction amount is calculated, the wide area gradation correction is performed on the image data subjected to the local gradation correction by the wide area gradation correcting section 28 on the basis of the correction amount calculated by the wide area gradation correction amount calculating section 27. For the wide area correction, the gradation correction methods such as the contrast correction and the gamma correction to adjust the image quality of the entire image can be employed. In case of using the contrast correction, the correction amounts a and b calculated by the wide area gradation correction amount calculating section 25 are used to correct a gradation of each pixel by using the following equation (18).

$$O_i(x,y) = aI_i(x,y) + b(i=R,G,B) \quad (18)$$

where i indicates the three primary colors (i=R, G, B), Ii (x, y) is an input pixel value, and Oi (x, y) is an output pixel value.

Figure 13:
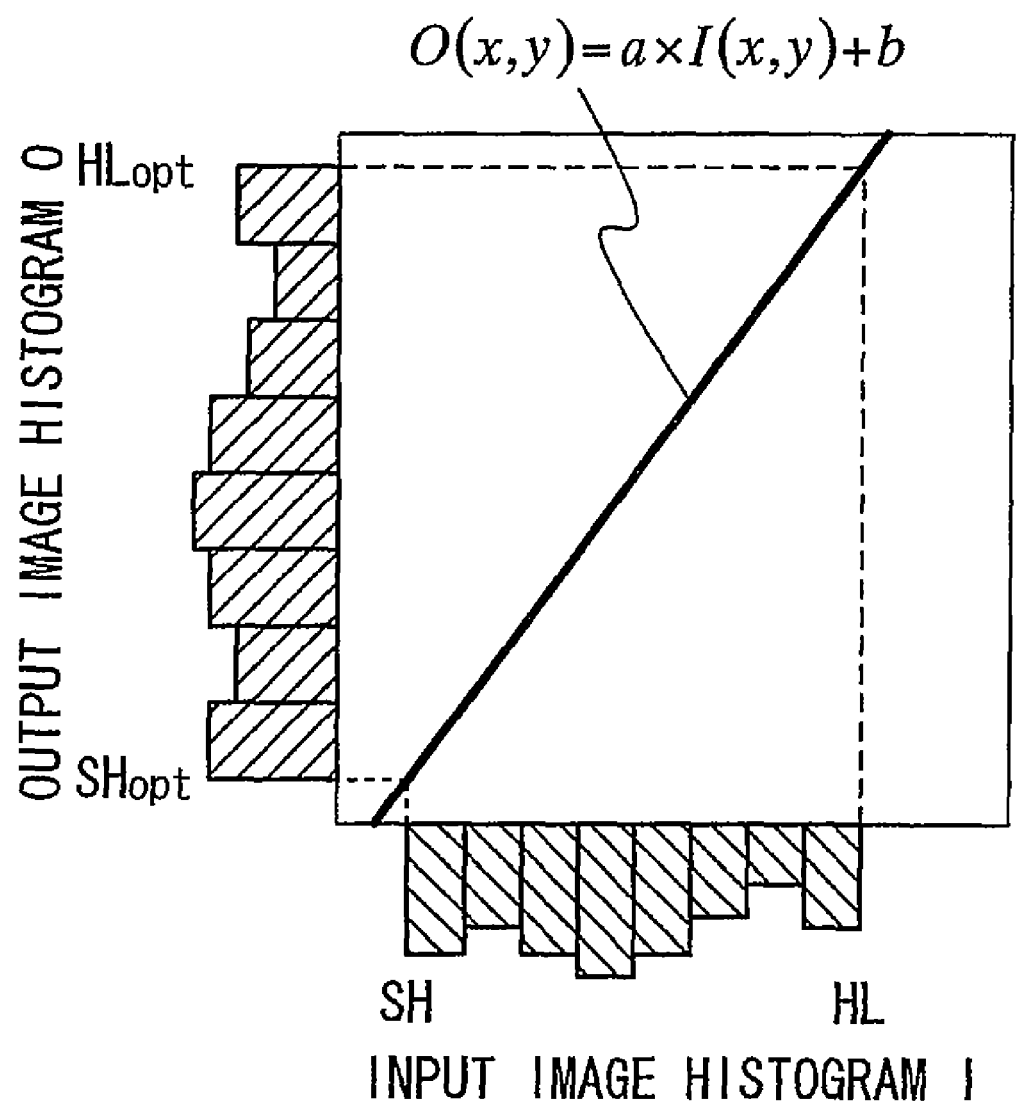
FIG. 13 is a diagram explaining an example of a wide area gradation correction according to the third embodiment.

In case of the contrast correction, gradation values of an inputted original image are distributed from a minimum gradation value SH to a maximum gradation value HL, as shown in FIG. 13. In order to allow the gradation values to be distributed from the minimum gradation value $SH_{opt}$ to the maximum gradation value $HL_{opt}$, as optimum gradation values of the image, the correction is performed through conversion based on the equation (18).

Although the equation (18) is an equation to process the three primary colors R, G and B individually, only the brightness component can be corrected. In case of correcting only the brightness component, a gradation value in an RGB space is divided into a brightness component and a chrominance component. Among these components, only the brightness component is corrected as an input value of the equation (18). The corrected brightness values and the original chrominance component are again converted into a gradation value in the RGB space. Only the brightness component can be thus corrected.

Figure 12:
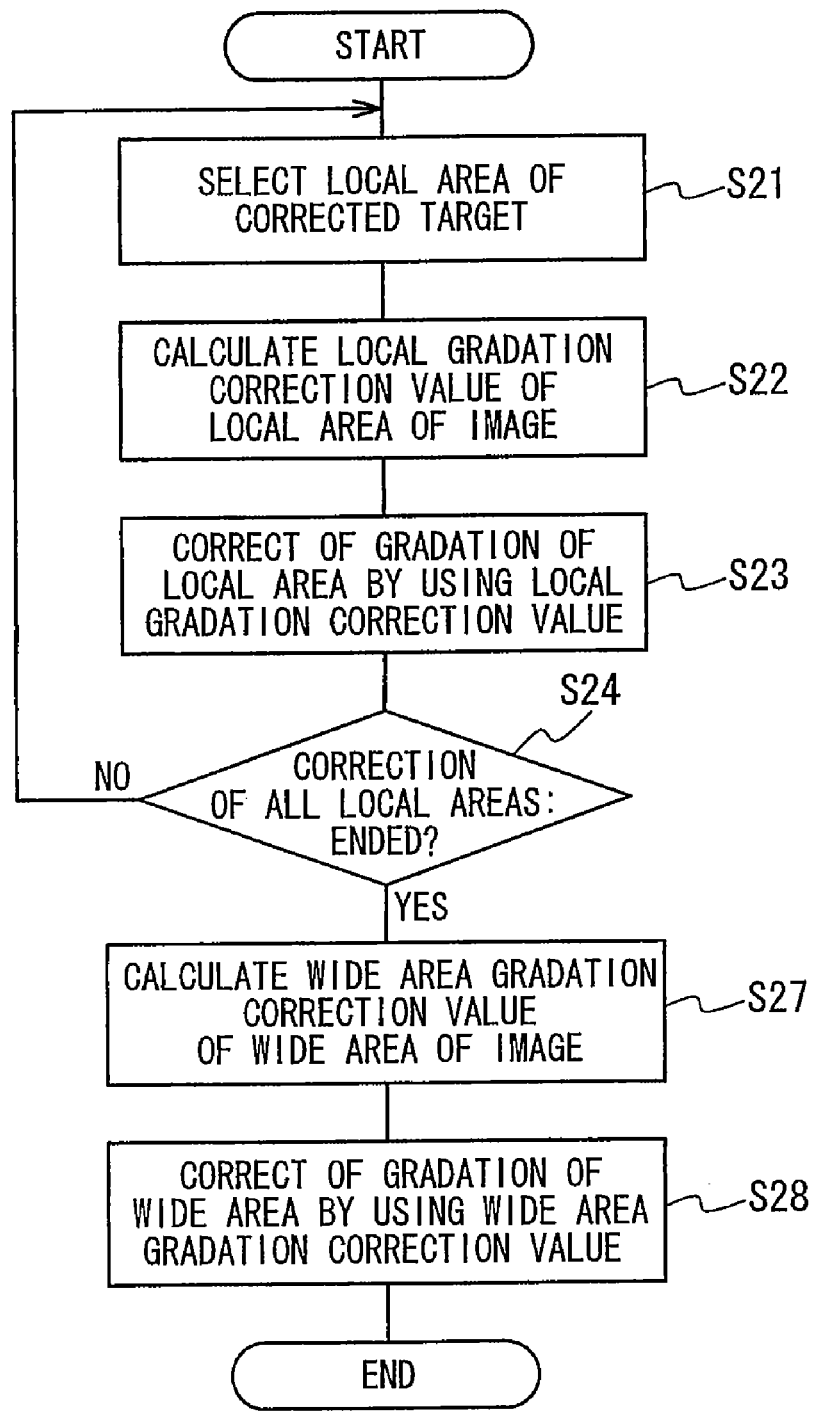
FIG. 12 is a flowchart showing an operation of the image processing system according to the third embodiment.

Next, an operation of the image processing system according to the third embodiment will be described with reference to a flowchart in FIG. 12. Operations from a step S21 to a step S24 are the same with the entire operation in the first embodiment.

The original image inputted from the image input unit 1 is initially supplied to the local area selecting section 21. The local area selecting section 21 selects a local area as a correction target from the inputted original image (step S21).

Next, the gradation correction amount of the local area of the original image is calculated in the correction amount calculating section 22 (step S22). For the gradation correction amount of the local area, the brightness values of the peripheral area are initially calculated on the basis of a median and an average value of the brightness histogram in the peripheral area, a weighted average brightness value taking the weighted average of brightness values in the peripheral area, and a weighted average brightness value of the reference point on the characteristic route or the like. The calculated brightness values of the peripheral area are converted into the gradation correction amount of the local area. The gradation correction amount of the local area is determined by image quality factors such as local area brightness values and contrast of the original image, and is a value to determine intensity of a gradation correction for optimizing the image quality of the local area of the image.

When the gradation correction amount of the local area is calculated, a gradation of a local area is corrected on the basis of the obtained local gradation correction amount (step S23). If the correction amount for correcting the local area is calculated as the gamma value, the local gradation correcting section 22 converts a gradation amount $I_i(x, y)$ of the local area into $O_i(x, y)$ on condition that i is R, G and B.

The local gradation correction is formed one by one for a local area having one or more regions. It is determined whether or not the gradation correction has been performed on all the local areas which should be corrected (step S24). If the local area without correction remains (step S24—NO), the correction amount is obtained and the gradation correction is performed for the area. If the correction is completed for the entire local areas (step S24—YES), the local gradation correction is ended to supply a locally corrected image for the wide area gradation correction. The locally corrected image may be outputted to perform the wide area gradation correction every time the correction on each of the local areas is ended.

When the gradation correction in the local area is ended, the wide area gradation correction is performed. In the wide area gradation correction, a wide area image quality of the image is initially determined. In case of the contrast correction, the wide area image quality is generally obtained by generating a brightness histogram of the entire image. That is, as shown in FIG. 13, the minimum brightness SH and the maximum brightness HL are obtained by the brightness histogram of the image. When the minimum brightness SH and the maximum brightness HL are calculated, the correction amounts a and b are calculated in accordance with the equations (14) and (15) by using an optimum brightness value $HL_{opt}$ in the highlight area and an optimum brightness value $SH_{opt}$ in the shadow area (step S25).

After the correction amounts a and b are calculated, the wide area gradation correcting section 28 performs the wide area gradation correction. In case of the contrast correction, the wide area gradation correction is performed on the basis of the equation (18). The image subjected to the wide area gradation correction is supplied to the image output unit 3, and the image correction processing is ended.

The gradation correction in the local area and the wide area is performed as described above. An example in which the above process is applied will be described here. An applied system includes a CCD camera as the image input unit 1, a personal computer as the image processing unit 2, and a display as the image output unit 3 in the same manner as those of the first embodiment. A program for the wide area gradation correction is provided additionally provided to a program of the personal computer in the first embodiment, that is, a program which is performed to be the wide area gradation correction amount calculating section 27 and the wide area gradation correcting section 28.

Figure 14:
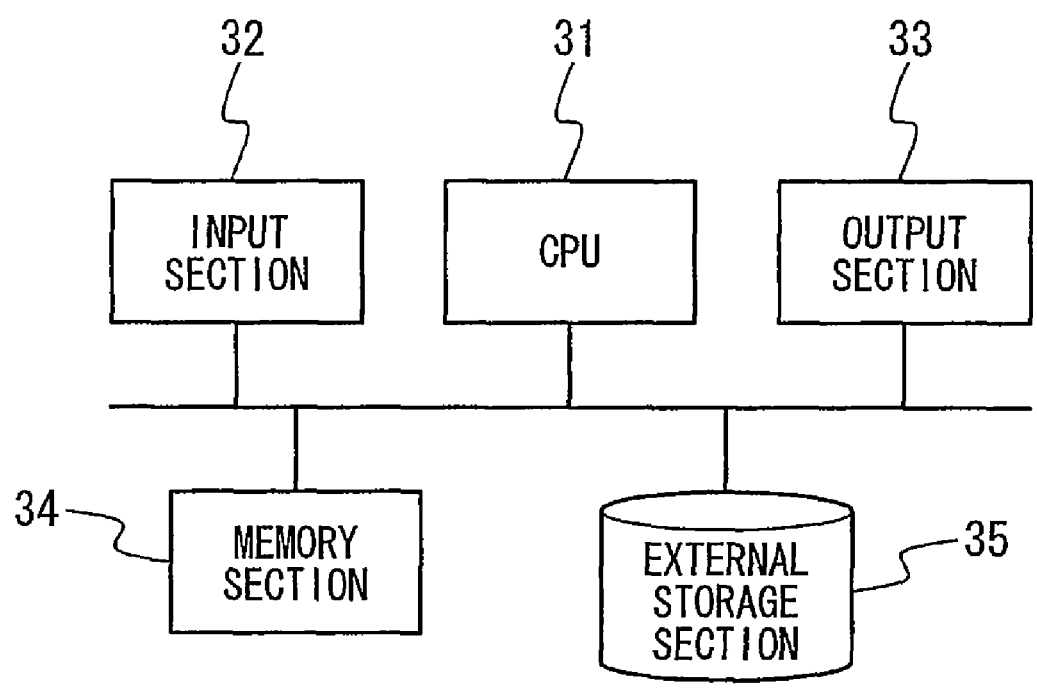
FIG. 14 is a block diagram showing a specific configuration of the image processing unit according to the present invention.

Although the configuration as shown in FIG. 14 was described as the third embodiment, the storage device 5 and the partial area brightness value storing unit 51 may be added while adding the partial area brightness calculating section 25 between the image input unit 1 and the local area selecting section 21, and the correction amount calculating section 22 may be replaced with the correction amount calculating section 26.

Figure 16A:
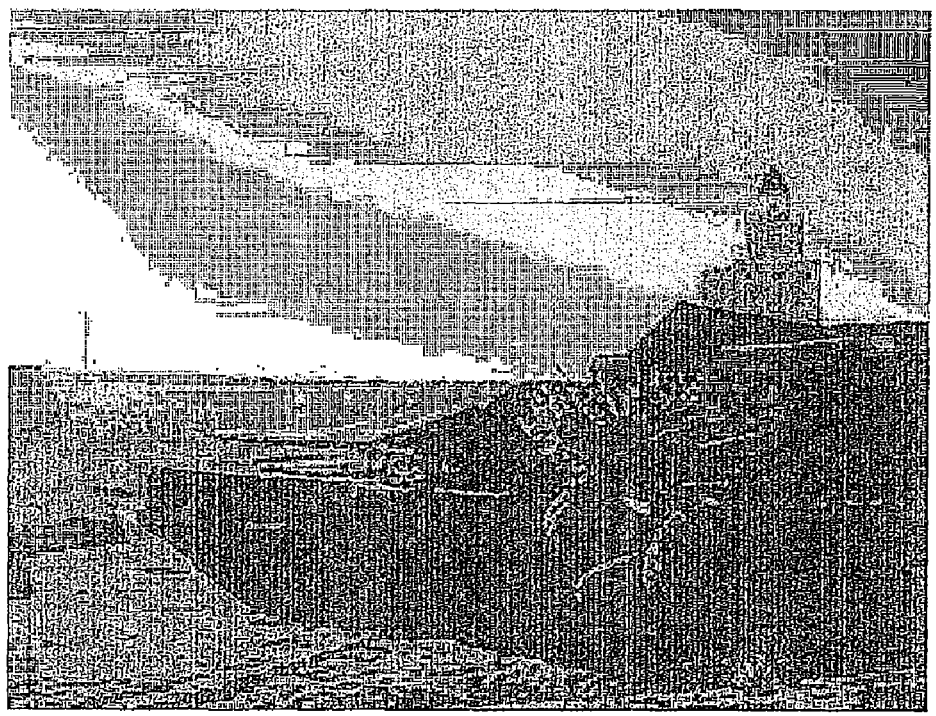
FIG. 16A is a diagram showing an example of image processing according to the third embodiment.
Figure 16B:
FIG. 16B is a diagram showing an example of the image processing according to the third embodiment.

It is assumed that an image shown in FIG. 15A is supplied from the CCD camera. At this time, the local gradation correction is initially performed to the original image in the same manner as the first embodiment. As a result of the local gradation correction, there is a case that the image quality of the entire image is deteriorated depending on the type of images as shown in FIG. 16A due to an excessive local gradation correction. In this case, the local gradation correction results in the improvement in a local image quality and the decrease in an image contrast. A gradation correction is performed on the image subjected to the local gradation correction by using the contrast correction indicated in the equation (18) as the wide area gradation correction. The correction amounts a and b are initially calculated from gradation values of pixels of the entire image on the basis of the equations (14) and (15). Next, a contrast of the image is corrected on the basis of the contrast correction expression of the equation (18). As a result, an image with an improved wide area image quality is obtained as shown in FIG. 16B. Visibility in the dark area is also improved in this corrected image in comparison with the original image. That is, it can be understood that a local image quality is also improved. The image processed as described above is displayed on the display, and the processing is ended.

As described above, the wide area image quality is improved in the image with a locally improved image quality by performing the wide area gradation correction after processing the local gradation correction, so that the image quality of the local area can be improved without damaging the image quality of the entire image.

According to the present invention, a process is successively performed and it is not necessary to store an intermediate result of the process, so that it is possible to provide the image processing apparatus, the image correction processing method, and the image correction processing program in which processing can be performed with a small memory capacity.

Moreover, according to the present invention, the wide area gradation correction is applied for an image as a result of the local gradation correction, so that it is possible to provide the image processing apparatus, the image correction processing method, and the image correction processing program in which a corrected image is made to have an appropriate image quality in the local and wide areas.

In relation to the above disclosure, following items are disclosed.

[item 33]
A computer readable software product recording codes for the software product for an image processing method including:

selecting a local area as at least a correction target from an input image, the local area including at least one pixel;

calculating a gradation correction amount of the local area; and performing gradation correction, in which a gradation value of the local area is corrected based on the gradation correction amount, to generate a local area gradation corrected image.

[item 34] The software product according to item 33, wherein the calculating a gradation correction amount comprises:

calculating a gradation value of a peripheral area to the local area; and calculating the gradation correction amount using the calculated gradation value of the peripheral area.

[item 35] The software product according to item 33, wherein the image processing method further includes:

calculating a representative gradation value in each of partial areas of the input image, wherein the calculating a gradation correction amount comprises:

calculating the gradation value of the peripheral area by using the representative gradation value of at least one of the partial areas in a vicinity of the local area; and calculating the gradation correction amount by using the calculated gradation value of the peripheral area.

[item 36] The software product according to any of items 33 to 35, wherein the image processing method further includes:

calculating a wide area correction amount of the local area gradation corrected image; and performing wide area gradation correction on the local area gradation corrected image, to generate a wide area gradation corrected image.

[item 37] The software product according to any of items 33 to 35, wherein the image processing method further includes:

supplying the input image; and outputting the local area gradation corrected image or the wide area gradation corrected image.

[item 38] The software product according to any of items 33 to 37, wherein the gradation value is a brightness value or a gradation value expressed by spectral components.

[item 39] The software product according to any of items 33 to 38, wherein the image processing method further includes repeating the gradation correction to the local area for a plural numbers of times while changing extension of the local area, or maintaining the extension of the local area.

[item 40] The software product according to any of items 33 to 38, wherein the selecting a local area comprising:

selecting a plurality of local areas, wherein the image processing method further comprising:

performing the gradation correction to each of the plurality of selected local areas.

[item 41] The software product according to item 34, wherein the calculating a gradation correction amount comprises:

calculating, as the gradation value of the peripheral area, a weighted average brightness value of a gradation value of the peripheral area and a Gaussian weight, or an average brightness value of the peripheral area.

[item 42] The software product according to item 34, wherein the calculating a gradation correction amount comprises:

setting one or more characteristic route lines to link the local area and a characteristic point;

determining one or more route characteristic points in each of the characteristic route lines; and calculating a gradation value of the route characteristic point or a weighted average brightness value of the route characteristic point as the gradation value of the peripheral area.

[item 43] The software product according to item 35, wherein the calculating a gradation value of the peripheral area comprises:

calculating the gradation value of the peripheral area by using a product of a ratio of a distance between the local area and at least one of the partial areas in vicinity thereof, and a representative gradation value of the partial area. representative gradation of the partial area.

[item 44] The software product according to item 35, wherein the representative gradation value is an average value or a median for entire or part of pixels contained in the partial area.

[item 45] The software product according to any of items 33 to 44, wherein the calculating the gradation correction amount comprises:

calculating the gradation correction amount to apply a more intensive correction in a shadow area than a highlight area.

[item 46] The software product according to any of items 33 to 44, wherein the calculating the gradation correction amount comprises:

calculating the gradation correction amount of the local area by using brightness of the peripheral area and brightness in a highlight area of the image.

[item 47] The software product according to any of items 33 to 46, wherein the calculating the gradation correction amount comprises:

performing the gradation correction by using a nonlinear function.

[item 48] The software product according to item 36, wherein the wide area gradation correction includes contrast emphasis.

The invention claimed is:
1. An image processing system comprising:
a local area selecting section configured to select a local area as at least one correction target from an input image, said local area including at least one pixel, and a peripheral area being presented around said local area;
a correction amount calculating section configured to calculate a gradation correction amount for said local area; and
a local gradation correcting section configured to perform gradation correction, in which a gradation value of said local area is corrected based on the gradation correction amount, to generate a local area gradation corrected image,
wherein said correction amount calculating section comprises:
a peripheral area gradation value calculating section configured to calculate a gradation value of said peripheral area; and
a local area correction amount converting section configured to calculate the gradation correction amount by using the calculated gradation value of said peripheral area, and
wherein said peripheral area gradation value calculating section sets one or more characteristic route lines to link said local area and characteristic point, determines one or more route characteristic points in each of the characteristic route lines, and calculates a gradation value of the route characteristic point or a weighted average brightness value of the route characteristic point as the gradation value.

2. The image processing system according to claim 1, further comprising:
   a wide area correction amount calculating section configured to calculate a wide area correction amount of said local area gradation corrected image; and
   a wide area correcting section configured to perform wide area gradation correction on said local area gradation corrected image based on the wide area correction amount, to generate a wide area gradation corrected image.

3. The image processing system according to claim 1, further comprising:
   an image input unit configured to supply the input image; and
   an image output section configured to output said local area gradation corrected image.

4. The image processing system according to claim 1, wherein the gradation value is a brightness value or a gradation value indicated by spectrum components.

5. The image processing system according to claim 1, wherein said gradation correction is repeated to said local area for a plural number of times while changing extension of said local area or maintaining the extension of said local area.

6. The image processing system according to claim 1, wherein said local area selecting section selects a plurality of local areas, and
   said gradation correction is applied to each of the plurality of selected local areas.

7. An image processing system comprising:
   a local area selecting section configured to select a local area as at least one correction target from an input image, said local area including at least one pixel, and a peripheral area being presented around said local area;
   a correction amount calculating section configured to calculate a gradation correction amount for said local area;
   a local gradation correcting section configured to perform gradation correction, in which a gradation value of said local area is corrected based on the gradation correction amount, to generate a local area gradation corrected image;
   a partial area brightness calculating section configured to calculate a representative gradation value in each of partial areas of the input image,
   wherein said correction amount calculating section comprises:
      a partial area reference type peripheral area brightness calculating section configured to calculate a gradation value of said peripheral area by using a representative gradation value of at least one of the partial areas in vicinity of said local area; and
      a local area correction amount converting section configured to calculate the gradation correction amount by using the calculated gradation value of said peripheral area, and
   wherein said partial area reference type peripheral area brightness calculating section calculates the gradation value of said peripheral area by using a product of a ratio of a distance between said local area and at least one of said partial areas in vicinity thereof, and the representative gradation of said partial area.

8. The image processing system according to claim 7, wherein the representative gradation value is an average value or a median for entire or part of pixels in the partial area.

9. The image processing system according to claim 1, wherein said correction amount calculating section calculates the gradation correction amount to apply a correction to a shadow area that is greater than a correction applied to a highlight area.

10. The image processing system according to claim 9, wherein said correction amount calculating section calculates the gradation correction amount of said local area by using brightness values of said peripheral area and brightness values in said highlight area of the image.

11. The image processing system according to claim 1, wherein said local gradation correcting section performs said gradation correction by using a nonlinear function.

12. The image processing system according to claim 2, wherein said wide area gradation correction includes a contrast emphasis.

13. An image processing method comprising:
   selecting a local area as at least a correction target from an input image, said local area including at least one pixel, and a peripheral area being presented around said local area;
   calculating a gradation correction amount of said local area; and
   performing gradation correction, in which a gradation value of said local area is corrected based on the gradation correction amount, to generate a local area gradation corrected image,
   wherein said calculating a gradation correction amount comprises:
      calculating a gradation value of said peripheral area; and
      calculating the gradation correction amount using the calculated gradation value of said peripheral area;
      setting one or more characteristic route lines to link said local area and a characteristic point;
      determining one or more route characteristic points in each of the characteristic route lines; and
      calculating a gradation value of the route characteristic point or a weighted average brightness value of the route characteristic point as the gradation value of said peripheral area.

14. The image processing method according to claim 13, further comprising:
   calculating a wide area correction amount of the local area gradation corrected image; and
   performing wide area gradation correction on the local area gradation corrected image, to generate a wide area gradation corrected image.

15. The image processing method according to claim 13, further comprising
   supplying the input image; and
   outputting the local area gradation corrected image.

16. The image processing method according to claim 13, wherein the gradation value is a brightness value or a gradation value expressed by spectral components.

17. The image processing method according to claim 13, further comprising:
   repeating the gradation correction to said local area for a plural numbers of times while changing extension of said local area, or maintaining the extension of said local area.

18. The image processing method according to claim 13, wherein said selecting a local area comprises:
   selecting a plurality of local areas,
   wherein said image processing method further comprising:
      performing the gradation correction to each of the plurality of selected local areas.

19. An image processing method comprising:
  selecting a local area as at least a correction target from an input image, said local area including at least one pixel, and a peripheral area being presented around said local area;
  calculating a gradation correction amount of said local area;
  performing gradation correction, in which a gradation value of said local area is corrected based on the gradation correction amount, to generate a local area gradation corrected image; and
  calculating a representative gradation value in each of partial areas of the input image,
  wherein said calculating a gradation correction amount comprises:
    calculating the gradation value of said peripheral area by using the representative gradation value of at least one of the partial areas in vicinity of said local area; and
    calculating the gradation correction amount by using the calculated gradation value of said peripheral area, and
  wherein said calculating a gradation value of said peripheral area comprises:
    calculating the gradation value of said peripheral area by using a product of a ratio of a distance between said local area and at least one of said partial areas in vicinity thereof, and a representative gradation value of said partial area.

20. The image processing method according to claim 19, wherein the representative gradation value is an average value or a median for entire or part of pixels contained in said partial area.

21. The image processing method according to claim 13, wherein said calculating the gradation correction amount comprises:
  calculating the gradation correction amount to apply a correction in a shadow area that is greater than a correction applied in a highlight area.

22. The image processing method according to claim 21, wherein said calculating the gradation correction amount comprises:
  calculating the gradation correction amount of said local area by using brightness of said peripheral area and brightness in a highlight area of the image.

23. The image processing method according to claim 13, wherein said calculating the gradation correction amount comprises:
  performing the gradation correction by using a nonlinear function.

24. The image processing method according to claim 14, wherein the wide area gradation correction includes contrast emphasis.

25. A non-transitory computer readable medium that causes a computer to carry out the functions of:
  selecting a local area as at least a correction target from an input image, said local area including at least one pixel, and a peripheral area being presented around said local area;
  calculating a gradation correction amount of said local area; and
  performing gradation correction, in which a gradation value of said local area is corrected based on the gradation correction amount, to generate a local area gradation corrected image,
  wherein the calculating a gradation correction amount comprises:
    calculating a gradation value of said peripheral area to said local area; and
    calculating the gradation correction amount using the calculated gradation value of the peripheral area;
  setting one or more characteristic route lines to link said local area and a characteristic point;
  determining one or more route characteristic points in each of the characteristic route lines; and
  calculating a gradation value of the route characteristic point or a weighted average brightness value of the route characteristic point as the gradation value of the peripheral area.

26. The non-transitory computer readable medium according to claim 25, wherein the computer further carries out the function of:
  calculating a wide area correction amount of said local area gradation corrected image; and
  performing wide area gradation correction on said local area gradation corrected image, to generate a wide area gradation corrected image.

27. The non-transitory computer readable medium according to claim 25, wherein the computer further carries out the function of:
  supplying the input image; and
  outputting said local area gradation corrected image or the wide area gradation corrected image.

28. The non-transitory computer readable medium according to claim 25, wherein the gradation value is a brightness value or a gradation value expressed by spectral components.

29. The non-transitory computer readable medium according to claim 25, wherein the computer further carries out the function of:
  repeating the gradation correction to said local area for a plural numbers of times while changing extension of said local area, or maintaining the extension of said local area.

30. The non-transitory computer readable medium according to claim 25, wherein the selecting a local area comprises:
  selecting a plurality of local areas,
  wherein the computer further carries out the function of:
  performing the gradation correction to each of the plurality of selected local areas.

31. A non-transitory computer readable medium that causes a computer to carry out the functions of:
  selecting a local area as at least a correction target from an input image, said local area including at least one pixel, and a peripheral area being presented around said local area;
  calculating a gradation correction amount of said local area; and
  performing gradation correction, in which a gradation value of said local area is corrected based on the gradation correction amount, to generate a local area gradation corrected image;
  calculating a representative gradation value in each of partial areas of the input image,
  wherein the calculating a gradation correction amount comprises:
    calculating the gradation value of the peripheral area by using the representative gradation value of at least one of the partial areas in a vicinity of said local area; and
    calculating the gradation correction amount by using the calculated gradation value of the peripheral area, and
  wherein the calculating a gradation value of the peripheral area comprises:
    calculating the gradation value of the peripheral area by using a product of a ratio of a distance between said local area and at least one of the partial areas in vicinity thereof, and a representative gradation value of the partial area.

32. The non-transitory computer readable medium according to claim 31, wherein the representative gradation value is an average value or a median for entire or part of pixels contained in the partial area.

33. The non-transitory computer readable medium according to claim 25, wherein the calculating the gradation correction amount comprises:
calculating the gradation correction amount to apply a correction in a shadow area that is greater than a correction applied in a highlight area.

34. The non-transitory computer readable medium according to claim 33, wherein the calculating the gradation correction amount comprises:
calculating the gradation correction amount of said local area by using brightness of the peripheral area and brightness in a highlight area of the image.

35. The non-transitory computer readable medium according to claim 25, wherein the calculating the gradation correction amount comprises:
performing the gradation correction by using a nonlinear function.

36. The non-transitory computer readable medium according to claim 26, wherein the wide area gradation correction includes contrast emphasis.

37. The image processing system according to claim 7, further comprising:
a wide area correction amount calculating section configured to calculate a wide area correction amount of said local area gradation corrected image; and
a wide area correcting section configured to perform wide area gradation correction on said local area gradation corrected image based on the wide area correction amount, to generate a wide area gradation corrected image.

38. The image processing system according to claim 7, further comprising:
an image input unit configured to supply the input image; and
an image output section configured to output said local area gradation corrected image.

39. The image processing system according to claim 7, wherein the gradation value is a brightness value or a gradation value indicated by spectrum components.

40. The image processing system according to claim 7, wherein said gradation correction is repeated to said local area for a plural number of times while changing extension of said local area or maintaining the extension of said local area.

41. The image processing system according to claim 7, wherein said local area selecting section selects a plurality of local areas, and
said gradation correction is applied to each of the plurality of selected local areas.

42. The image processing system according to claim 7, wherein said correction amount calculating section calculates the gradation correction amount to apply a more intensive correction to a shadow area than a highlight area.

43. The image processing system according to claim 7, wherein said local gradation correcting section performs said gradation correction by using a nonlinear function.

44. The image processing system according to claim 43, wherein said wide area gradation correction includes a contrast emphasis.

* * * * *